US012015575B2

(12) United States Patent
Muruganathan et al.

(10) Patent No.: US 12,015,575 B2
(45) Date of Patent: *Jun. 18, 2024

(54) LOW OVERHEAD APERIODIC TRIGGERING OF MULTI-SYMBOL SRS

(71) Applicant: Telefonaktiebolaget LM Ericsson (publ), Stockholm (SE)

(72) Inventors: Siva Muruganathan, Stittsville (CA); Shiwei Gao, Nepean (CA); Sebastian Faxér, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,052

(22) Filed: Sep. 8, 2022

(65) Prior Publication Data

US 2023/0006792 A1 Jan. 5, 2023

Related U.S. Application Data

(63) Continuation of application No. 17/270,008, filed as application No. PCT/IB2019/056989 on Aug. 19, 2019, now Pat. No. 11,456,835.

(Continued)

(51) Int. Cl.
*H04L 5/00* (2006.01)
*H04L 27/26* (2006.01)

(52) U.S. Cl.
CPC .......... *H04L 5/0048* (2013.01); *H04L 5/0078* (2013.01); *H04L 27/261* (2013.01)

(58) Field of Classification Search
CPC .... H04L 5/0048; H04L 5/0078; H04L 27/261
See application file for complete search history.

(56) References Cited

U.S. PATENT DOCUMENTS 11,456,835 B2 * 9/2022 Muruganathan ...... H04L 5/0078
2011/0268087 A1 11/2011 Kwon et al.
(Continued)

FOREIGN PATENT DOCUMENTS

EP 2437402 A1 4/2012
EP 2579490 A2 4/2013

OTHER PUBLICATIONS

Author Unknown, "Technical Specification Group Radio Access Network; Evolved Universal Terrestrial Radio Access (E-UTRA); Physical channels and modulation (Release 15)," Technical Specification 36.211, Version 15.2.0, 3GPP Organizational Partners, Jun. 2018, 236 pages.

(Continued)

*Primary Examiner* — Kevin C. Harper
(74) *Attorney, Agent, or Firm* — Withrow & Terranova, PLLC

(57) ABSTRACT

Systems and methods are disclosed herein for providing aperiodic Sounding Reference Signal (SRS) triggering in a wireless system. Embodiments of a method performed by a wireless device and corresponding embodiments of a wireless device are disclosed. In some embodiments, a method in a wireless device for triggering aperiodic SRS comprises receiving a first SRS configuration for a first type of aperiodic SRS transmission and a second SRS configuration for a second type of aperiodic SRS transmission. The method further comprises receiving downlink control information comprising a parameter for triggering an aperiodic SRS transmission and determining whether to use the first SRS configuration or the second SRS configuration. The method further comprises transmitting an aperiodic SRS transmission in accordance with the determined SRS configuration. Embodiments of a method performed by a base station and (Continued)

corresponding embodiments of a base station are also disclosed.

18 Claims, 21 Drawing Sheets

Related U.S. Application Data

(60) Provisional application No. 62/719,990, filed on Aug. 20, 2018.

(56) References Cited

U.S. PATENT DOCUMENTS

| | | |
|---|---|---|
| 2011/0310818 A1 | 12/2011 | Lin et al. |
| 2012/0257582 A1 | 10/2012 | Damnjanovic et al. |
| 2013/0078913 A1 | 3/2013 | Lee et al. |
| 2013/0128855 A1 | 5/2013 | Noh et al. |
| 2013/0195084 A1 | 8/2013 | Chen et al. |
| 2013/0250893 A1 | 9/2013 | Li et al. |
| 2016/0165545 A1 | 6/2016 | Ouchi et al. |
| 2021/0250149 A1 | 8/2021 | Muruganathan et al. |

OTHER PUBLICATIONS

Author Unknown, "Technical Specification Group Radio Access Network; Evolved Universal Terrestrial Radio Access (E-UTRA); Physical layer procedures (Release 15)," Technical Specification 36.213, Version 15.2.0, 3GPP Organizational Partners, Jun. 2018, 536 pages.
Huawei, et al., "RP-181485: New WI proposal: DL MIMO efficiency enhancements for LTE," Third Generation Partnership Project (3GPP), TSG RAN Meeting #80, Jun. 11-14, 2018, 4 pages, La Jolla, USA.
Samsung, "R1-1713596: Discussion on UL beam management," Third Generation Partnership Project (3GPP), TSG RAN WG1 Meeting #90, Aug. 21-25, 2017, 5 pages, Prague, Czech.
Sony, "R1-1805695: Summary of SRS," 3GPP TSG RAN WG1 Meeting #92-Bis, Apr. 16-20, 2018, Sanya, China, 51 pages.
Qualcomm Incorporated, "R1-1809037: Additional SRS symbols," 3GPP TSG RAN WG1 Meeting #94, Aug. 20-24, 2018, Gothenburg, Sweden, 5 pages.
Vivo, "R1-1800192: Remaining issues and text proposals on SRS design," Third Generation Partnership Project (3GPP), RSG RAN WG1 Meeting AH 1801, Jan. 22-26, 2018, 7 pages, Vancouver, Canada.
Non-Final Office Action for U.S. Appl. No. 17/270,008, dated Jun. 15, 2021, 13 pages.
Final Office Action for U.S. Appl. No. 17/270,008, dated Sep. 30, 2021, 15 pages.
Non-Final Office Action for U.S. Appl. No. 17/270,008, dated Feb. 7, 2022, 17 pages.
Notice of Allowance for U.S. Appl. No. 17/270,008, dated May 20, 2022, 6 pages.
First Office Action for Chinese Patent Application No. 201980067256. 5, dated Jul. 27, 2021, 13 pages.
Intention to Grant for European Patent Application No. 19773183.9, dated Jun. 9, 2022, 5 pages.
International Search Report and Written Opinion for International Patent Application No. PCT/IB2019/056989, dated Nov. 12, 2019, 13 pages.
Written Opinion for International Patent Application No. PCT/IB2019/056989, dated Jun. 29, 2020, 11 pages.
International Preliminary Report on Patentability for International Patent Application No. PCT/IB2019/056989, dated Sep. 11, 2020, 26 pages.

* cited by examiner

| SRS CONFIGURATIONS: | |
|---|---|
| SRS CONFIGURATION #1 | (LEGACY SRS) |
| SRS CONFIGURATION #2 | (LEGACY SRS) |
| SRS CONFIGURATION #3 | (REL-16 SRS) |

| BIT FIELD IN DCI FOR SRS TRIGGERING | TRIGGERED SRS CONFIGURATION |
|---|---|
| 00 | NO SRS TRIGGER |
| 01 | SRS CONFIG #1 |
| 10 | SRS CONFIG #2 |
| 11 | SRS CONFIG #3 |

FIG. 11

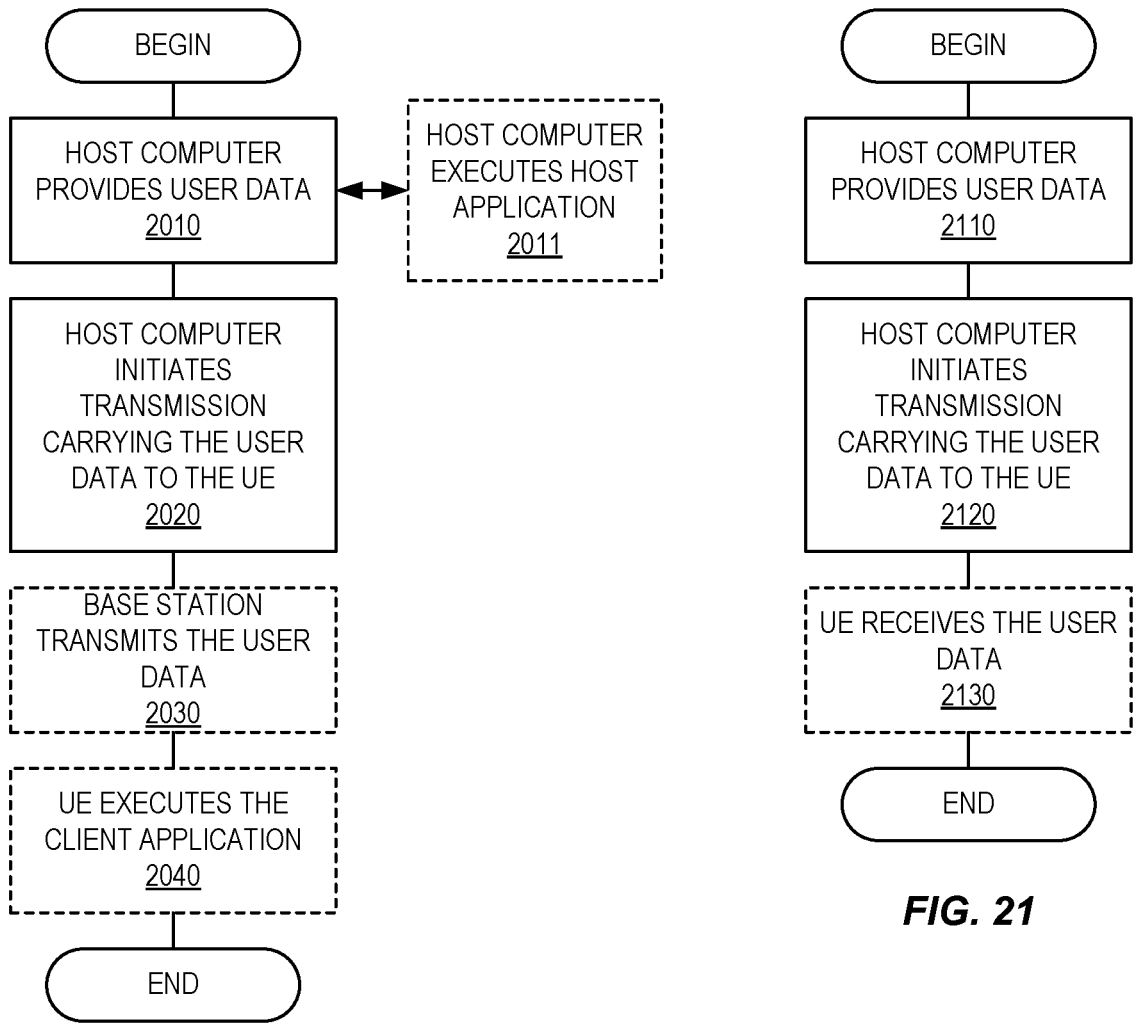

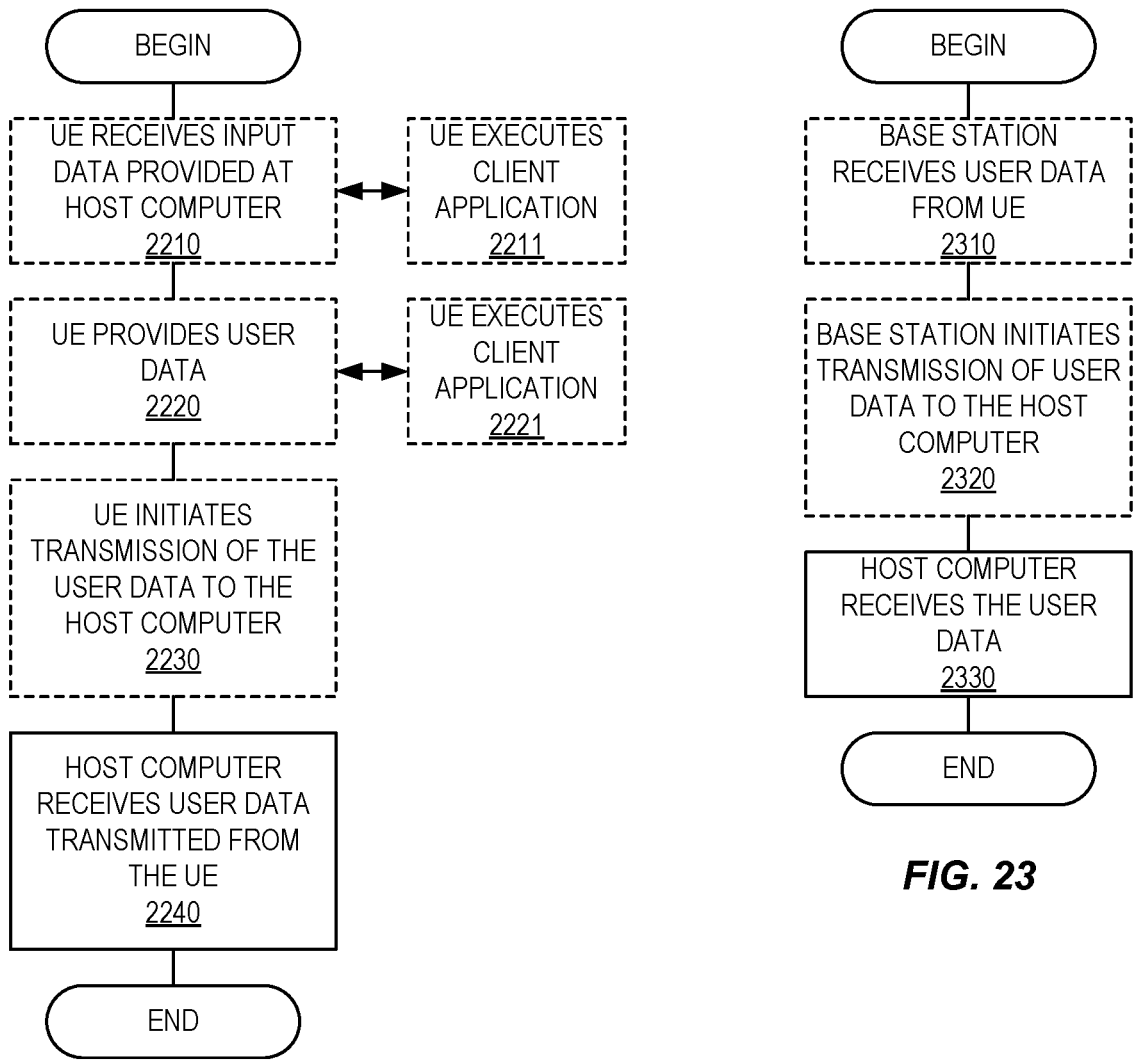

LOW OVERHEAD APERIODIC TRIGGERING OF MULTI-SYMBOL SRS

RELATED APPLICATIONS

This application is a continuation of patent application Ser. No. 17/270,008, filed Feb. 20, 2021, now U.S. Pat. No. 11,456,835, which is a 35 U.S.C. § 371 national phase filing of International Application No. PCT/IB2019/056989, filed Aug. 19, 2019, which claims the benefit of provisional patent application Ser. No. 62/719,990, filed Aug. 20, 2018, the disclosures of which are hereby incorporated herein by reference in their entireties.

TECHNICAL FIELD

The present disclosure relates to aperiodic Sounding Reference Signal (SRS) triggering in a wireless system.

BACKGROUND

Long Term Evolution (LTE) uses Orthogonal Frequency Division Multiplexing (OFDM) in the downlink and Discrete Fourier Transform (DFT)-spread OFDM in the uplink (UL). The basic LTE physical resource can thus be seen as a time-frequency grid as illustrated in FIG. 1, where each Resource Element (RE) corresponds to one OFDM subcarrier during one OFDM symbol interval. Furthermore, the resource allocation in LTE is typically described in terms of resource blocks, where a resource block corresponds to one slot (0.5 millisecond (ms)) in the time domain and 12 contiguous subcarriers in the frequency domain. Resource blocks are numbered in the frequency domain, starting with 0 from one end of the system bandwidth.

In the time domain, downlink (DL) and UL transmissions in LTE are organized into equally-sized subframes as shown in FIG. 2. In LTE, the subframe length is 1 ms. There are two slots per subframe for the subcarrier spacing of 15 kilohertz (kHz) supported in LTE, thus there are 20 slots per radio frame. In Time Domain duplexing (TDD) systems, the subframes can be UL subframes, DL subframes, or special subframes. In the UL subframes, all the symbols are allocated for UL transmissions. In the DL subframes, all the symbols are allocated for DL transmissions. A special subframe is used to switch between UL and DL or vice versa. The special subframe consists of a DL part (referred to as DL Pilot Time Slot (DwPTS)), a UL part (referred to as UL Pilot Time Slot (UpPTS)), and a guard period.

DL transmissions are dynamically scheduled, i.e., in each subframe the enhanced or evolved Node B (eNB) transmits DL Control Information (DCI) about which User Equipment (UE) data is to be transmitted to and which resource blocks in the current DL subframe the data is transmitted on. This control signaling is typically transmitted within the first three OFDM symbols in each subframe in LTE. The control information is carried on the Physical Downlink Control Channel (PDCCH) and data is carried on the Physical Downlink Shared Channel (PDSCH). A UE first detects and decodes PDCCH and, if a PDCCH is decoded successfully, it then decodes the corresponding PDSCH based on the decoded control information in the PDCCH.

UL data transmissions are also dynamically scheduled using PDCCH. Similar to DL, a UE first decodes UL grants in PDCCH and then transmits data over the Physical Uplink Shared Channel (PUSCH) based on the decoded control information in the UL grant such as modulation order, coding rate, UL resource allocation, etc.

In addition to PUSCH, Physical Uplink Control Channel (PUCCH) is also supported in LTE to carry UL Control Information (UCI) such as Hybrid Automatic Repeat Request (HARQ) related Acknowledgment (ACK), Negative Acknowledgment (NACK), or Channel State Information (CSI) feedback.

The Sounding Reference Signal (SRS) is used for UL channel quality measurements for frequency-selective scheduling and link adaption. SRS is also used for UL timing estimation and UL power control.

Until Release 15 in LTE, in normal UL subframes configured for SRS transmission, SRS can only be transmitted by a UE in the last Single Carrier Orthogonal Frequency Division Multiple Access (SC-OFDMA) symbol. The location of SRS in a Physical Resource Block (PRB) in an SRS subframe where the SRS subframe is a normal UL subframe is shown in FIG. 3, where Demodulation Reference Signal (DMRS) symbols are used for channel estimation in PUSCH demodulation.

The subframes in which SRS transmission can occur in a cell are referred to as cell-specific SRS subframes. In current LTE specifications, the cell-specific SRS subframe configuration is configured with a periodicity given by $T_{SFC}$ and subframe offset given by $\Delta_{SFC}$, as defined in clause 5.5.3.3 of [1]. A cell-specific SRS subframe is a subframe that satisfies $\lfloor n_s/2 \rfloor \mathrm{mod} T_{SFC} \in \Delta_{SFC}$, where $n_s \in \{0, 1, \ldots, 19\}$ denotes the slot number within a radio frame. A UE can be configured to transmit SRS on a subset of the cell-specific SRS subframes. These subsets of cell-specific SRS subframes are also referred to as UE-specific SRS configurations. As defined in clause 8.2 of [2], a UE-specific SRS configuration includes an SRS transmission periodicity $T_{SRS}$ and subframe offset $T_{offset}$. It should be noted that the UE-specific SRS configuration can be different for periodic SRS and aperiodic SRS. An example of cell-specifically configured SRS subframes and UE-specifically configured SRS subframes is shown in FIG. 4.

A UE can be configured with different SRS bandwidths. In general, two kinds of SRS bandwidths are supported, one is wideband and the other is narrowband. In case of wideband SRS bandwidth, channel measurement over the full system bandwidth can be performed in a single subframe. While in narrowband SRS bandwidth, only part of the full system bandwidth can be measured in a subframe, and thus multiple SRS subframes are needed for a full bandwidth channel measurement. Frequency Hopping (FH) is supported for narrowband SRS so that different parts of the frequency band can be measured in different subframes.

Furthermore, two types of SRS are supported, i.e. periodic (also referred to as type 0) and aperiodic (also referred to as type 1). In case of periodic SRS, a UE transmits SRS periodically at certain configured SRS subframes. In case of aperiodic SRS, a UE transmits SRS only when it is requested by the eNB. The SRS subframes for periodic and aperiodic SRS are separately configured for a UE. Both are comprised within the cell-specific SRS subframes.

The SRS bandwidth for a UE is configurable and is a multiple of 4 PRBs. The minimum SRS bandwidth is four PRBs. An example of wideband and narrowband SRS with 10 Megahertz (MHz) system bandwidth is shown in FIG. 5.

In case of narrowband SRS with FH, an SRS is transmitted on different parts of the system bandwidth at different SRS subframes. For example, for a 10 MHz system and SRS bandwidth of four PRBs, a possible set of locations in the frequency domain for SRS transmission are shown in FIG. 6. In this example, the whole bandwidth can be measured after 12 SRS subframes.

An SRS signal is a phase-shifted Zadoff-Chu (ZC) sequence. Different UEs can be multiplexed on the same time-frequency resources by assigning different phase shifts, known as Cyclic Shifts (CSs). There are eight CSs defined in LTE Release 8. In addition, an SRS signal is only transmitted on half of the subcarriers in the configured SRS bandwidth, either even-numbered or odd-numbered subcarriers, configurable through a parameter called a comb. Therefore, up to 16 UEs can be multiplexed on the same SRS bandwidth. In LTE Release 8 to Release 12, 2-comb is supported, meaning SRS can be transmitted on every other subcarrier.

In current LTE specifications [1], the SRS sequences are a function of the physical cell Identity (ID) $N_{ID}^{cell}$. Specifically, the ZC base sequences $\bar{y}_{u,v}(n)$ used to construct the SRS sequences are parameterized by the sequence group number u and the number v within the group, and $N_{ID}^{cell}$ is used to select the values of u and v. This implies that SRS transmissions for all UEs connected to the same cell must use the same ZC base sequence, which only enables user separation in a completely orthogonal fashion by using different combs or CSs.

In LTE Release 13, support for 4-comb was introduced, which means that an SRS signal can be mapped to every fourth subcarrier, thereby increasing the SRS multiplexing capacity provided that the channel is sufficiently flat so that transmitting SRS on every fourth subcarrier is adequate.

UEs with different SRS bandwidths can be multiplexed on an SRS subframe with different comb values. UEs with the same SRS bandwidth can be multiplexed in an SRS subframe with different CSs.

Up to LTE Release 12, one or two Single Carrier Frequency Division Multiple Access (SC-FDMA) symbols can be used for SRS transmission in UpPTS. In LTE Release 13, the number of SC-FDMA symbols that can be used for SRS in UpPTS was extended to up to six SC-FDMA symbols.

In LTE Release 13 SRS enhancements, a new set of Radio Resource Control (RRC) parameters were introduced for additional SRS symbols in UpPTS for both aperiodic and periodic SRS.

In LTE, up to Release 15, three sets of SRS parameters are higher layer configured for aperiodic SRS triggering with UL-related DCI formats 4, 4A, 4B, and 7-0B. A two-bit SRS request field present in DCI formats 4, 4A, 4B, and 7-0B indicate the SRS parameter set according to Table 1 below. As shown in Table 1, given the value of the SRS request field in DCI formats 4, 4A, 4B, and 7-0B, aperiodic SRS transmission corresponding to one of the SRS parameter sets will be triggered or no aperiodic SRS transmission will be triggered.

TABLE 1

SRS request value for trigger type 1 in DCI format 4/4A/4B/7-0B (extracted from [2])

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

For UL-related DCI formats 0, 0A, 0B, 6-0A, and 7-0A, a single set of SRS parameters is configured by higher layers for aperiodic SRS triggering. Similarly, for DL-related DCI formats 1A, 2B, 2C, 2D, 6-1A, 7-1E, 7-1F, and 7-1G, a single set of SRS parameters is configured by higher layers for aperiodic SRS triggering. For theses DCI formats 0, 1A, 2B, 2C, 2D, 6-0A, 6-1A, 7-0A, 7-1E, 7-1F, and 7-1G, there is a 1-bit SRS request field. If this bit field is set to '1', aperiodic SRS transmission corresponding to the SRS parameter set configured for the DCI format carrying the SRS request will be triggered.

PUSCH rate matching refers to the process of determining the available REs in a subframe for carrying PUSCH modulation symbols. The number of available REs in a UL subframe can be different depending on:

whether or not the subframe is also a cell-specific SRS subframe,

SRS bandwidth, and scheduled PUSCH bandwidth and PRB location.

When a subframe is not configured as a cell-specific SRS subframe, then the available REs for a PUSCH can be easily calculated as a product of the number of PRBs scheduled and the number of REs in a PRB. For normal cyclic prefix, the number of REs available per PRB equals 12 SC-FDMA symbols times 12 subcarriers=144 REs.

However, when the subframe is also an SRS subframe, the number of available of REs per PRB can vary. An example is shown in FIG. 7. In particular, FIG. 7 illustrates three different scenarios of PUSCH scheduled in a subframe with SRS. In scenario (A), the PUSCH PRBs are fully overlapped with the SRS. In this case, the last SC-OFDM symbol has to be removed from the calculation of available PUSCH REs, or rate matched around the SRS. In scenario (B), PUSCH is partially overlapped with SRS and in this case, the last SC-FDMA symbol is also removed from the calculation of available PUSCH REs in LTE. In scenario (C), there is no overlap between PUSCH and SRS, so in this case the last OFDM symbol is counted in the calculation of available PUSCH REs.

Since both the subframes for SRS transmission and the maximum SRS bandwidth in a cell are signaled to all UEs semi-statically, a UE can perform PUSCH rate matching when a PUSCH is scheduled in a subframe.

For LTE Release 16, a work item was approved in June 2018 for improving LTE DL Multiple Input Multiple Output (MIMO) efficiency enhancements [3]. SRS enhancements are part of this work item and the objectives of this work item are listed below:

Specify the support of SRS capacity/coverage enhancements by introducing more than one symbol for SRS on a UL normal subframe and virtual cell ID for SRS [RAN1]

Introduce more than one symbol for SRS for one UE or for multiple UEs on a UL normal subframe Baseline: the minimum SRS resource allocation granularity for a cell is one slot, when more than one symbol in a normal subframe is allocated for SRS for the cell Enhancements on PUCCH and PUSCH are not in scope Introduce virtual cell ID for SRS With the introduction of virtual cell ID for SRS, the ZC base sequences $\bar{y}_{u,v}(n)$ used to construct the SRS sequences can be parameterized by the sequence group number u and the number v within the group, wherein the UE specifically configured virtual cell ID is used to select the values of u and v. Hence, pseudo-orthogonal SRS transmissions within a cell are possible and the different users can be separated in the spatial domain. This can potentially improve SRS capacity. Furthermore, specifying multi-symbol SRS on UL normal subframes will also yield SRS capacity/coverage enhancements for LTE in Release 16.

With the introduction of more than one symbol for SRS on UL normal subframes and/or virtual cell ID for SRS in normal UL subframes (henceforth referred to as Release 16 LTE SRS), it is conceivable that a LTE Release 16 UE is configured with both Release 16 LTE SRS and legacy SRS (i.e., single symbol SRS) in normal subframe. Hence, how to aperiodically trigger SRS without increasing the DCI overhead due the size of the SRS request field in LTE Release 16 UEs is an open problem.

SUMMARY

Systems and methods are disclosed herein for providing aperiodic Sounding Reference Signal (SRS) triggering in a wireless system. Embodiments of a method performed by a wireless device and corresponding embodiments of a wireless device are disclosed. In some embodiments, a method in a wireless device for triggering aperiodic SRS comprises receiving a first SRS configuration for a first type of aperiodic SRS transmission and a second SRS configuration for a second type of aperiodic SRS transmission. The method further comprises receiving downlink control information comprising a parameter for triggering an aperiodic SRS transmission and determining whether to use the first SRS configuration or the second SRS configuration. The method further comprises transmitting an aperiodic SRS transmission in accordance with the determined SRS configuration. In this manner, the parameter comprised in the downlink control information can be used to trigger either the first type of aperiodic SRS transmission (e.g., a legacy SRS transmission) or the second type of aperiodic SRS transmission (e.g., a new type of SRS transmission, e.g., a Release 16 SRS transmission).

In some embodiments, the first SRS configuration is a configuration for transmission of: (a1) an SRS transmission in a last Single Carrier Frequency Division Multiple Access (SC-FDMA) symbol of a normal uplink subframe, (b1) an SRS sequence generated from a physical cell identity of a corresponding cell, or both (a1) and (b1). Further, the second SRS configuration is a configuration for transmission of: (a2) an SRS transmission in more than one SC-FDMA symbol of a normal uplink subframe, (b2) an SRS sequence generated from a virtual cell identity, or both (a2) and (b2).

In some embodiments, the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration. Further, determining whether to use the first SRS configuration or the second SRS configuration comprises determining whether to use the first SRS configuration or the second SRS configuration based on the multi-bit parameter and mappings between the first and second values of the parameter and the first and second SRS configurations.

In some embodiments, the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration. The value of the parameter comprised in the downlink control information for triggering an aperiodic SRS transmission is the first value, and determining whether to use the first SRS configuration or the second SRS configuration comprises determining to use the first SRS configuration based on the value of the multi-bit parameter and the mapping between the first value of the parameter and the first SRS configuration.

In some embodiments, the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration. The value of the parameter comprised in the downlink control information for triggering an aperiodic SRS transmission is the second value, and determining whether to use the first SRS configuration or the second SRS configuration comprises determining to use the second SRS configuration based on the value of the multi-bit parameter and the mapping between the second value of the parameter and the second SRS configuration.

In some embodiments, the first SRS configuration is for a first set of wireless device specific SRS uplink normal subframes, and the second SRS configuration is for a second set of wireless device specific uplink normal subframes. Receiving the downlink control information comprising the parameter for triggering an aperiodic SRS transmission comprises receiving the downlink control information in a first subframe to trigger an aperiodic SRS transmission in a second subframe, and determining whether to use the first SRS configuration or the second SRS configuration comprises determining whether to use the first SRS configuration or the second SRS configuration based on whether the second subframe is included in the first set of wireless device specific SRS uplink normal subframes or the second set of wireless device specific SRS uplink normal subframes. In some embodiments, the second subframe is a first available SRS subframe n+k, where n is a subframe number that corresponds to the first subframe and k is greater than or equal to a predetermined or signaled value $k_p$.

Further, in some embodiments, the first set of wireless device specific SRS uplink normal subframes and the second set of wireless device specific SRS uplink normal subframes are disjoint sets. Determining whether to use the first SRS configuration or the second SRS configuration based on whether the second subframe is included in the first set of wireless device specific SRS uplink normal subframes or the second set of wireless device specific SRS uplink normal subframes comprises: determining to use the first SRS configuration if the second subframe is in the first set of wireless device specific SRS uplink normal subframes and determining to use the second SRS configuration if the second subframe is in the second set of wireless device specific SRS uplink normal subframes.

Further, in some other embodiments, the first set of wireless device specific SRS uplink normal subframes and the second set of wireless device specific SRS uplink normal subframes overlap, and the second subframe is included in both the first set of wireless device specific SRS uplink normal subframes and the second set of wireless device specific SRS uplink normal subframes. Determining whether to use the first SRS configuration or the second SRS configuration based on whether the second subframe is included in the first set of wireless device specific SRS uplink normal subframes or the second set of wireless device specific SRS uplink normal subframes comprises determining whether to use the first SRS configuration or the second SRS configuration based on a predefined or preconfigured rule that defines how collisions are to be handled.

Further, in some other embodiments, the first set of wireless device specific SRS uplink normal subframes and the second set of wireless device specific SRS uplink normal subframes overlap, and the second subframe is included in both the first set of wireless device specific SRS uplink normal subframes and the second set of wireless device specific SRS uplink normal subframes. Determining whether to use the first SRS configuration or the second SRS configuration based on whether the second subframe is included in the first set of wireless device specific SRS uplink normal subframes or the second set of wireless device specific SRS uplink normal subframes comprises determining whether to use the first SRS configuration or the second SRS configuration based on priorities associated with the first SRS configuration and the second SRS configuration or based on periodicities of the first SRS configuration and the second SRS configuration.

In some embodiments, the method further comprises receiving an indication to use an indicated type of aperiodic SRS triggering, the indicated type of aperiodic SRS triggering being a first type of aperiodic SRS triggering or a second type of aperiodic SRS triggering. Determining whether to use the first SRS configuration or the second SRS configuration comprises determining whether to use the first SRS configuration or the second SRS configuration based on the indication. In some embodiments, receiving the indication comprises receiving the indication via higher layer signaling. In some other embodiments, receiving the indication comprises receiving the indication via a Medium Access Control (MAC) Control Element (CE).

In some embodiments, a wireless device for triggering aperiodic SRS is adapted to receive a first SRS configuration for a first type of aperiodic SRS transmission and a second SRS configuration for a second type of aperiodic SRS transmission. The wireless device is further adapted to receive downlink control information comprising a parameter for triggering an aperiodic SRS transmission, and determine whether to use the first SRS configuration or the second SRS configuration. The wireless device is further adapted to transmit an aperiodic SRS transmission in accordance with the determined SRS configuration. Ion some embodiments, the wireless device comprises one or more transmitters, one or more receivers, and processing circuitry associated with the one or more transmitters and the one or more receivers, wherein the processing circuitry configured to cause the wireless device to receive the first SRS configuration for the first type of aperiodic SRS transmission and the second SRS configuration for the second type of aperiodic SRS transmission, receive the downlink control information comprising the parameter for triggering the aperiodic SRS transmission, determine whether to use the first SRS configuration or the second SRS configuration, and transmit the aperiodic SRS transmission in accordance with the determined SRS configuration.

Embodiments of a method performed by a base station and corresponding embodiments of a base station are also disclosed. In some embodiments, a method performed by a base station for triggering aperiodic SRS comprises transmitting, to a wireless device, a first SRS configuration for a first type of aperiodic SRS transmission and a second SRS configuration for a second type of aperiodic SRS transmission. The method further comprises transmitting, to the wireless device, downlink control information comprising a parameter for triggering an aperiodic SRS transmission, and receiving, from the wireless device, an aperiodic SRS transmission in accordance with one of the first and second SRS configurations.

In some embodiments, the first SRS configuration is a configuration for transmission of: (a) an SRS transmission in a last SC-FDMA symbol of a normal UL subframe and/or (b) an SRS sequence generated from a physical cell Identity (ID), and the second SRS configuration is a configuration for transmission of: (a) an SRS transmission in more than one SC-FDMA symbol of a normal UL subframe and/or (b) an SRS sequence generated from a virtual cell ID.

In some embodiments, the first SRS configuration is for a first set of wireless device specific SRS uplink normal subframes, and the second SRS configuration is for a second set of wireless device specific uplink normal subframes. Transmitting the downlink control information comprising the parameter for triggering an aperiodic SRS transmission comprises transmitting the downlink control information in a first subframe to trigger an aperiodic SRS transmission in a second subframe. Receiving the aperiodic SRS transmission in accordance with one of the first and second SRS configurations comprises receiving, from the wireless device, the aperiodic SRS transmission in accordance with one of the first and second SRS configurations as a function of whether the second subframe is included in the first set of wireless device specific SRS uplink normal subframes or the second set of wireless device specific SRS uplink normal subframes. In some embodiments, the second subframe is a first available SRS subframe n+k, where n is a subframe number that corresponds to the first subframe and k is greater than or equal to a predetermined or signaled value $k_p$.

Further, in some embodiments, the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration. Receiving the aperiodic SRS transmission in accordance with one of the first and second SRS configurations comprises receiving, from the wireless device, the aperiodic SRS transmission in accordance with the value of the parameter and mappings between the first and second values of the parameter and the first and second SRS configurations.

Further, in some other embodiments, the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration. The value of the parameter comprised in the downlink control information for triggering an aperiodic SRS transmission is the first value, and receiving the aperiodic SRS transmission in accordance with one of the first and second SRS configurations comprises receiving, from the wireless device, the aperiodic SRS transmission in accordance with the mapping between the first value of the parameter and the first SRS configuration.

Further, in some other embodiments, the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration. The value of the parameter comprised in the downlink control information for triggering an aperiodic SRS transmission is the second value, and receiving the aperiodic SRS transmission in accordance with one of the first and second SRS configurations comprises receiving, from the wireless device, the aperiodic SRS transmission in accordance with the mapping between the second value of the parameter and the second SRS configuration.

In some embodiments, the first set of wireless device specific SRS uplink normal subframes and the second set of wireless device specific SRS uplink normal subframes are disjoint sets, and receiving the aperiodic SRS transmission in accordance with one of the first and second SRS configurations comprises: receiving, from the wireless device, the aperiodic SRS transmission in accordance with the first SRS configuration if the second subframe is in the first set of wireless device specific SRS uplink normal subframes; and receiving, from the wireless device, the aperiodic SRS transmission in accordance with the second SRS configuration if the second subframe is in the second set of wireless device specific SRS uplink normal subframes.

In some embodiments, the first set of wireless device specific SRS uplink normal subframes and the second set of wireless device specific SRS uplink normal subframes overlap, and the second subframe is included in both the first set of wireless device specific SRS uplink normal subframes and the second set of wireless device specific SRS uplink normal subframes. Receiving the aperiodic SRS transmission in accordance with one of the first and second SRS configurations comprises receiving, from the wireless device, the aperiodic SRS transmission in accordance with one of the first and second SRS configurations in accordance with a predefined or preconfigured rule that defines how collisions are to be handled.

In some embodiments, the first set of wireless device specific SRS uplink normal subframes and the second set of wireless device specific SRS uplink normal subframes overlap, and the second subframe is included in both the first set of wireless device specific SRS uplink normal subframes and the second set of wireless device specific SRS uplink normal subframes. Determining whether to use the first SRS configuration or the second SRS configuration based on whether the second subframe is included in the first set of wireless device specific SRS uplink normal subframes or the second set of wireless device specific SRS uplink normal subframes comprises determining whether to use the first SRS configuration or the second SRS configuration based on priorities associated with the first SRS configuration and the second SRS configuration or based on periodicities of the first SRS configuration and the second SRS configuration.

In some embodiments, the method further comprises transmitting, to the wireless device, an indication to use an indicated type of aperiodic SRS triggering, the indicated type of aperiodic SRS triggering being a first type of aperiodic SRS triggering or a second type of aperiodic SRS triggering. Receiving the aperiodic SRS transmission in accordance with one of the first and second SRS configurations comprises receiving, from the wireless device, the aperiodic SRS transmission in accordance with one of the first and second SRS configurations in accordance with the indication. In some embodiments, transmitting the indication comprises transmitting the indication via higher layer signaling. In some other embodiments, transmitting the indication comprises transmitting the indication via a MAC CE.

In some embodiments, a base station for triggering aperiodic SRS is adapted to transmit, to a wireless device, a first SRS configuration for a first type of aperiodic SRS transmission and a second SRS configuration for a second type of aperiodic SRS transmission. The base station is further adapted to transmit, to the wireless device, downlink control information comprising a parameter for triggering an aperiodic SRS transmission and receive, from the wireless device, an aperiodic SRS transmission in accordance with one of the first and second SRS configurations. In some embodiments, the base station comprises processing circuitry configured to cause the base station to transmit, to the wireless device, the first SRS configuration for the first type of aperiodic SRS transmission and the second SRS configuration for the second type of aperiodic SRS transmission, transmit, to the wireless device, the downlink control information comprising the parameter for triggering the aperiodic SRS transmission, and receive, from the wireless device, the aperiodic SRS transmission in accordance with one of the first and second SRS configurations.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 11 illustrates an example of associating an SRS configuration with either legacy or Release 16 SRS when more than one bit is used in a Downlink Control Information (DCI) for SRS triggering in accordance with a third embodiment of the present disclosure;

FIGS. 20 through 23 are flowcharts illustrating method implemented in a communication system, in accordance with some embodiments of the present disclosure.

DETAILED DESCRIPTION

Figure 1:
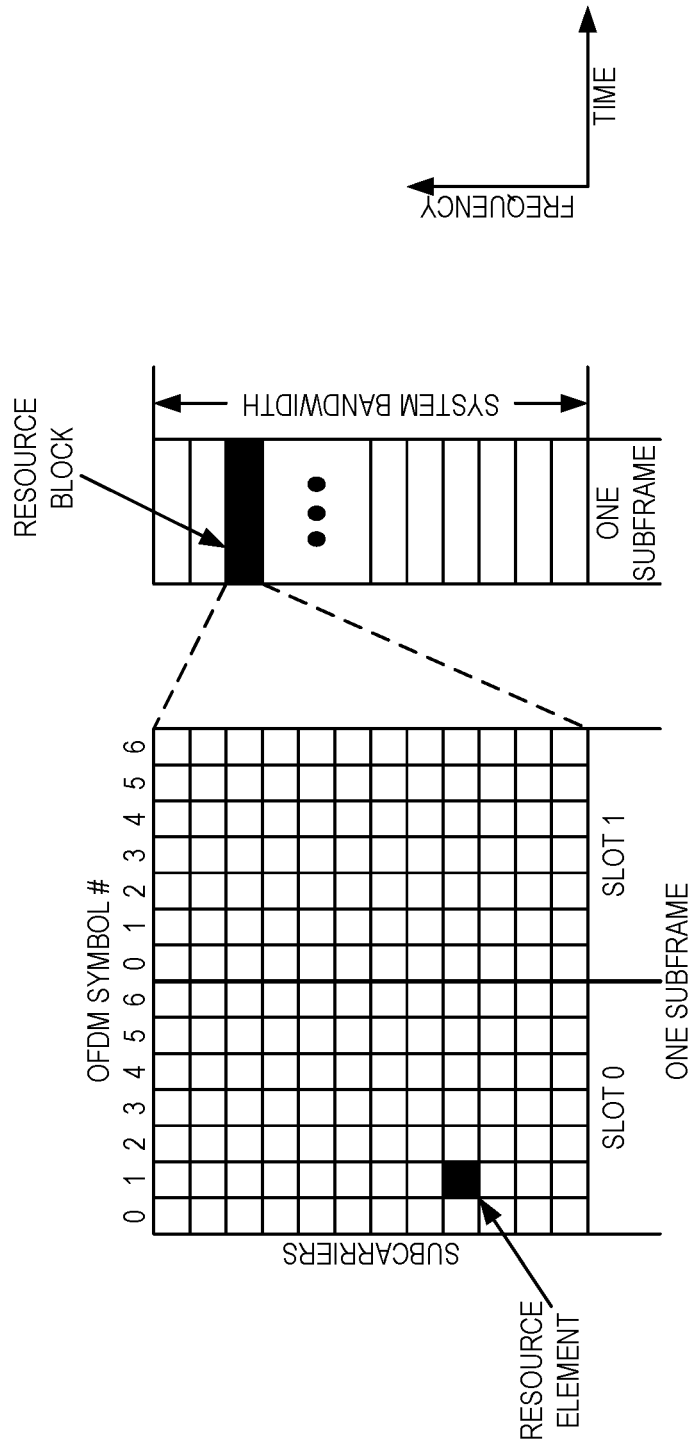
FIG. 1 illustrates the basic Long Term Evolution (LTE) physical resource.
Figure 2:
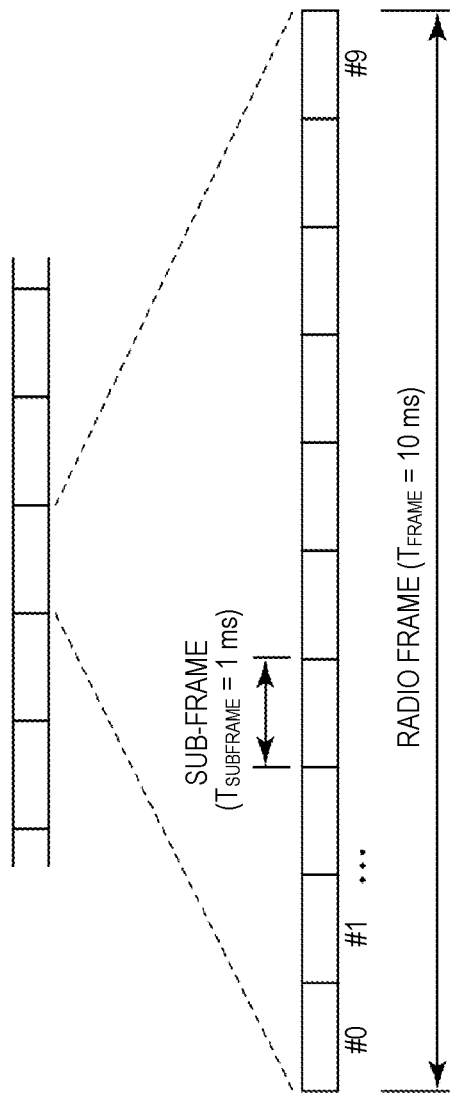
FIG. 2 illustrates the time-domain structure of uplink (UL) and downlink (DL) transmissions in LTE.
Figure 3:
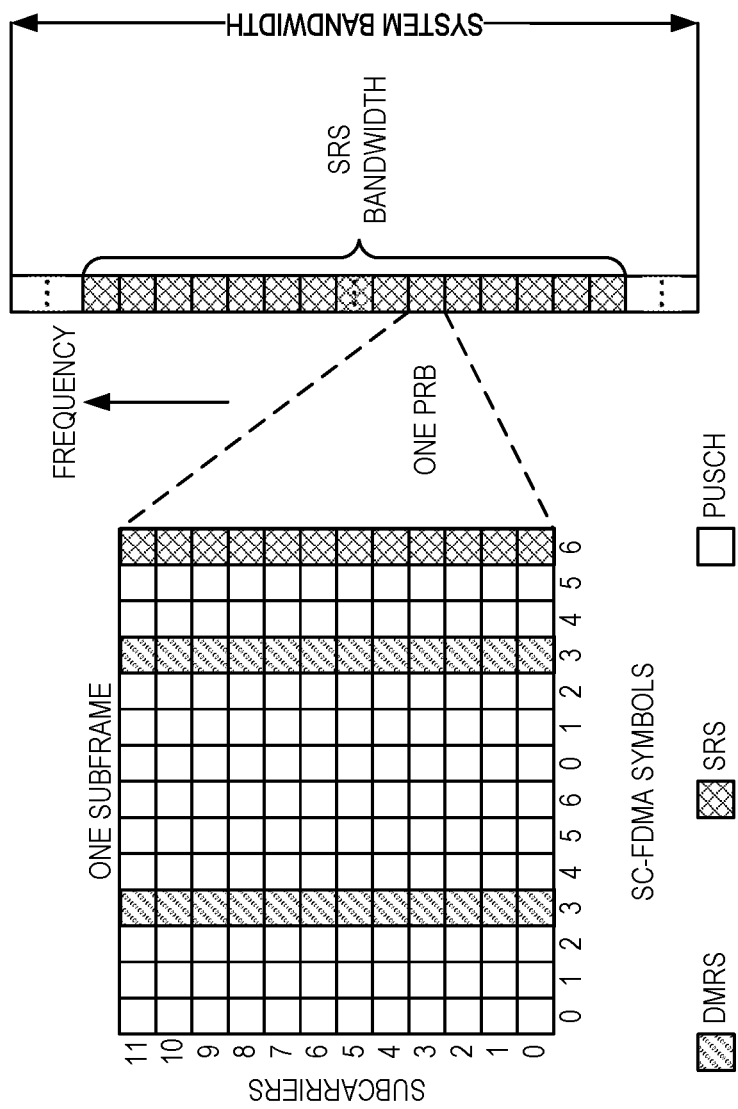
FIG. 3 illustrates the location of Sounding Reference Signal (SRS) in a Physical Resource Block (PRB) in an SRS subframe.
Figure 4:
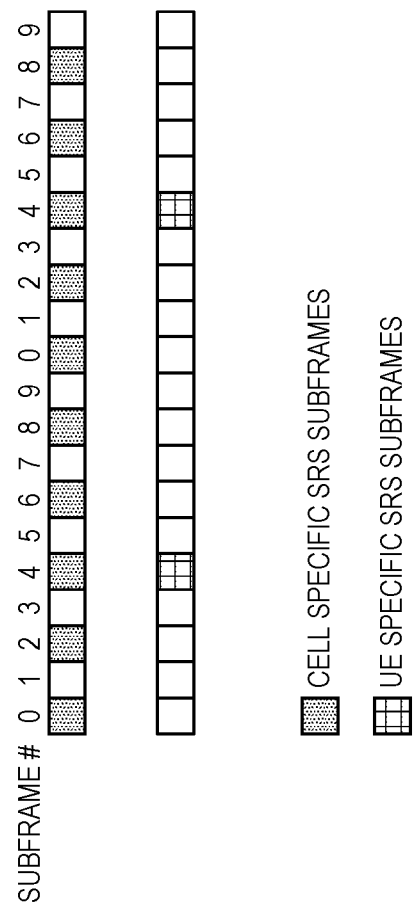
FIG. 4 illustrates an example of cell-specifically configured SRS subframes and User Equipment (UE)-specifically configured SRS subframes.
Figure 5:
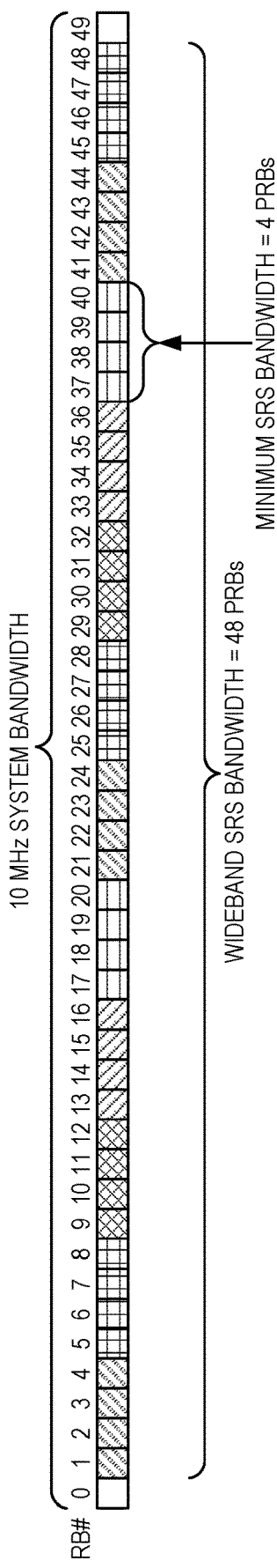
FIG. 5 illustrates an example of wideband and narrowband SRS with 10 Megahertz (MHz) system bandwidth.
Figure 6:
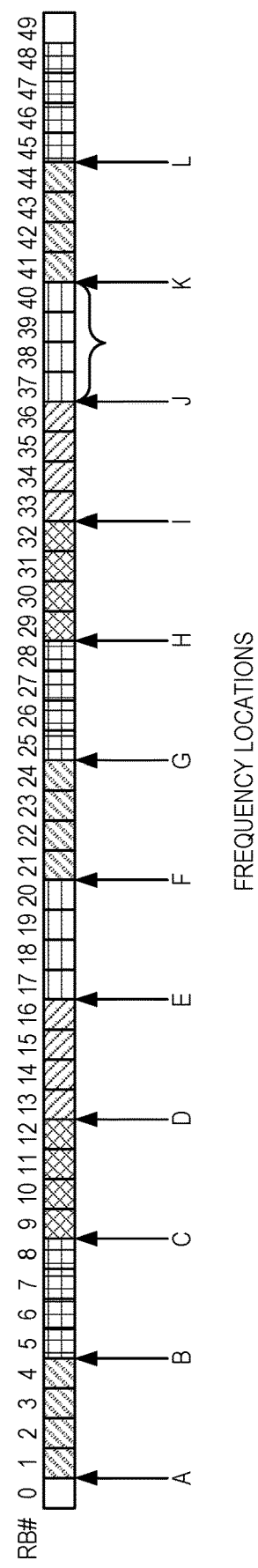
FIG. 6 illustrates a possible set of locations in the frequency domain for SRS transmission for an example with a 10 MHz system bandwidth and SRS bandwidth of four PRBs.
Figure 7:
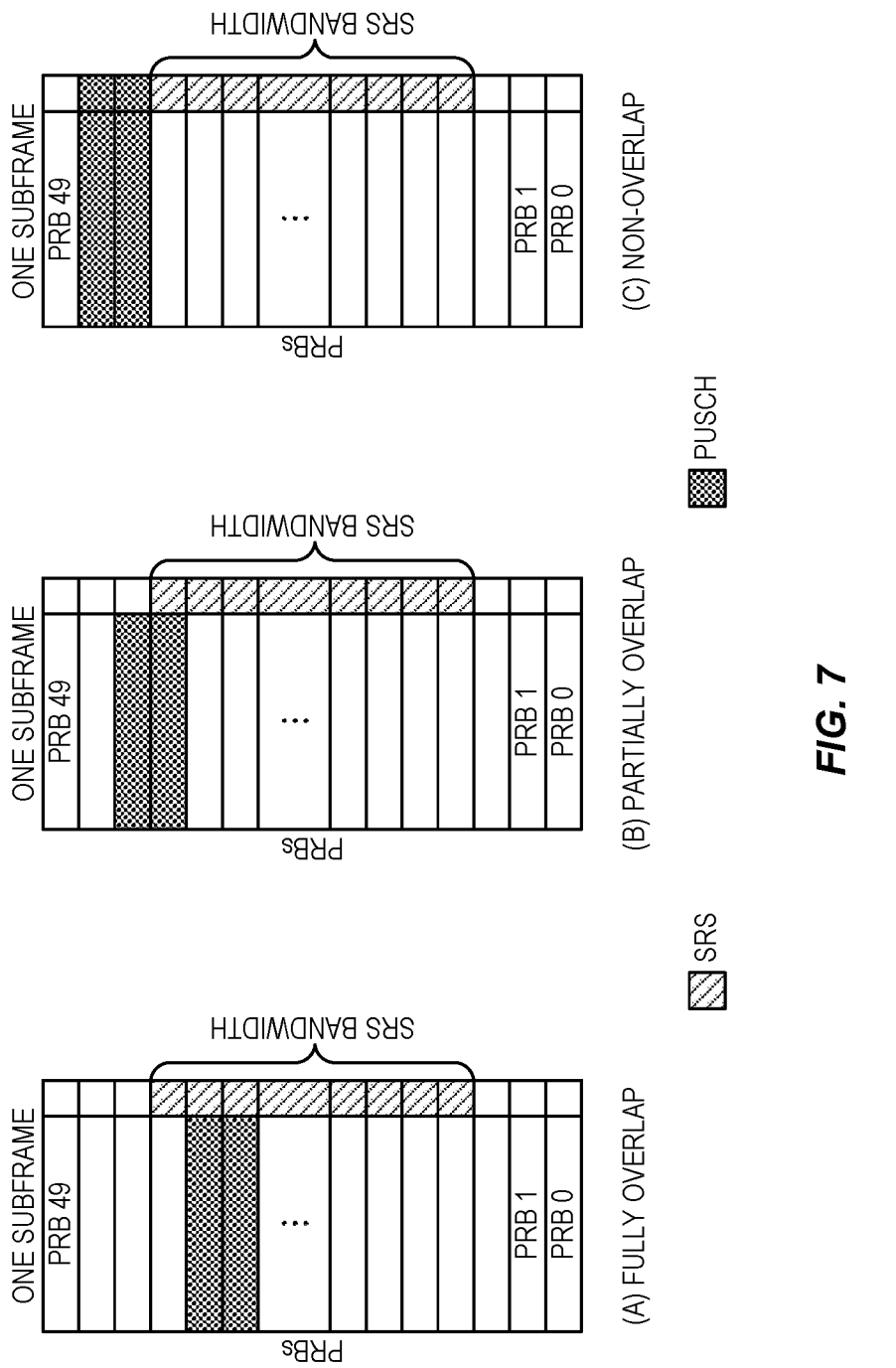
FIG. 7 illustrates three different scenarios of Physical Uplink Shared Channel (PUSCH) scheduled in a subframe with SRS.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that although terminology from Third Generation Partnership Project (3GPP) Long Term Evolution (LTE) has been used in this disclosure as an example, this should not be seen as limiting the scope of the embodiments disclosed herein to only the aforementioned system. Other wireless systems, including Wideband Code Division Multiple Access (WCDMA), Worldwide Interoperability for Microwave Access (WiMax), Ultra Mobile Broadband (UMB), and Global System for Mobile Communications (GSM), may also benefit from exploiting the ideas covered within the present disclosure.

Also note that terminology such as enhanced or evolved Node B (eNodeB or eNB) and User Equipment (UE) should be considering non-limiting and does in particular not imply a certain hierarchical relation between the two. In general "eNodeB" could be considered as device 1 and "UE" device 2, and these two devices communicate with each other over some radio channel. Herein, the focus is on wireless transmissions in the downlink (DL), but the embodiments described herein are equally applicable in the uplink (UL).

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Certain aspects of the present disclosure and their embodiments may provide solutions to these or other challenges. Systems and methods are disclosed herein for providing aperiodic Sounding Reference Signal (SRS) triggering. In some embodiments, aperiodic SRS triggering is provided for at least two different types of SRS configurations including a first type (e.g., legacy aperiodic SRS) and a second type (e.g., Release 16 aperiodic SRS). In general, a first SRS configuration(s) is provided to the UE for aperiodic SRS triggering for a first type of SRS (e.g., legacy SRS) and a second SRS configuration(s) is provided to the UE for aperiodic SRS triggering for a second type of SRS (e.g., Release 16 SRS). Preferably, the same Downlink Control Information (DCI) parameter (i.e., the same DCI field) is used to triggering aperiodic SRS for both the first and second type of SRS. Embodiments are disclosed herein to provide various ways in which, upon receiving DCI including the parameter to trigger aperiodic SRS, the UE decides whether to transmit the first type of aperiodic SRS in accordance with the first SRS configuration or to transmit the second type of aperiodic SRS in accordance with the second SRS configuration. As discussed below, this decision may be made based on the transmission time (e.g., subframe) in which the aperiodic SRS is to be transmitted (e.g., where the first and second SRS configurations apply to different sets of UL subframes), based on an indicator received by the UE from the network (e.g., via Radio Resource Control (RRC) signaling or via Medium Access Control (MAC) Control Element (CE)), or based on a value of the parameter (e.g., different values are mapped to different SRS configurations).

In a first embodiment ("Embodiment 1"), whether legacy SRS or Release 16 SRS configuration is triggered is determined using the UL normal subframe in which the aperiodic SRS trigger in DCI is received.

In a second embodiment ("Embodiment 2"), whether legacy SRS or Release 16 SRS configuration is triggered is determined using one or more higher layer parameters that activate one of the legacy SRS configuration or the Release 16 SRS configuration.

In a third embodiment ("Embodiment 3"), whether the legacy SRS configuration or Release 16 SRS configuration is triggered is determined using MAC CE that activates one of the legacy SRS configuration or the Release 16 SRS configuration.

Preferably, in Embodiments 1, 2, and 3, aperiodic SRS for both legacy SRS and Release 16 SRS is triggered with the same length SRS request field in DCI.

Certain embodiments may provide one or more of the following technical advantage(s). In some embodiments, additional bits do not need to be added to DCI and both legacy SRS and Release 16 SRS can be aperiodically triggered with a same length SRS request field.

Embodiment 1: Configuration of Different UE Specific Subframes for Release 16 SRS and Legacy SRS In this embodiment, the Release 16 SRS and legacy SRS for a UE are configured in different UE specific SRS UL normal subframes, and aperiodic SRS is triggered with the same SRS request field in existing DCI formats, i.e., one bit for DCI format 0/2B/2C/2D and two bits in DCI format 4/4A/4B. Whether Release 16 SRS or legacy SRS is triggered depends on which UE specific SRS UL normal subframe the aperiodic SRS is triggered in.

Figure 8:
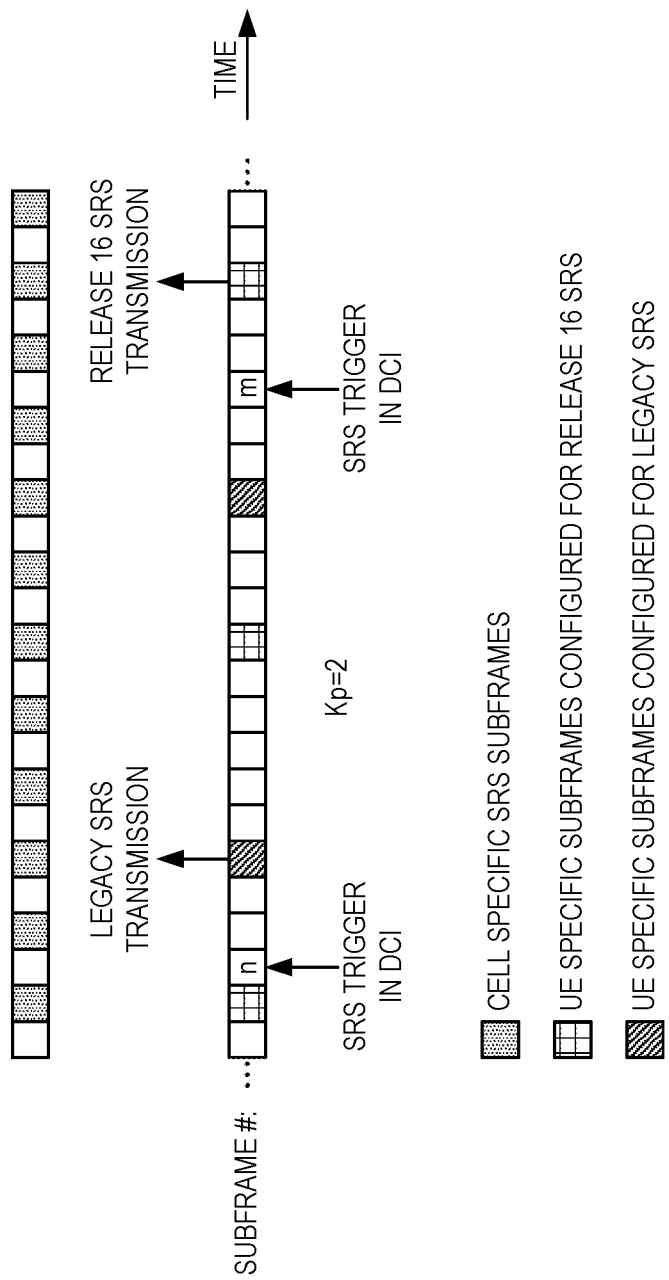
FIG. 8 illustrates an example of a first embodiment of the present disclosure.

FIG. 8 shows an example of this embodiment. In this example, cell-specific SRS subframes have a periodicity of 2 milliseconds (ms), while the UE-specific UL normal subframes allocated for legacy SRS and the UE-specific UL normal subframes allocated for Release 16 SRS both have a similar periodicity. However, UE-specific UL normal subframes allocated for legacy SRS are offset by 4 ms from the UE-specific UL normal subframes allocated for Release 16 SRS.

If the DCI triggering an aperiodic SRS transmission is received in subframe n, the SRS transmission is supposed to be in a UE specifically configured SRS subframe n+k with k≥$k_p$ and $k_p$ is predetermined or signaled to a UE. If the first SRS subframe n+k satisfying the condition of k≥$k_p$ is a subframe allocated for legacy SRS, the UE interprets the SRS request field in the DCI received in subframe n as a request for legacy SRS. Otherwise, if the first SRS subframe n+k satisfying the condition of k≥$k_p$ is a UL normal subframe allocated for Release 16 SRS, the UE interprets the SRS request field in the DCI received in subframe n as a request for Release 16 SRS.

Looking again at the example of FIG. 8 in which cell-specific SRS subframes have a periodicity of two subframes as shown on the top of FIG. 8, a subset of subframes of the cell-specific SRS subframes with a periodicity of 10 subframes is configured for a UE for legacy SRS transmission and another subset of subframes of the cell-specific SRS subframes for Release 16 SRS transmission. At subframe n, the UE receives an SRS trigger in DCI. Assuming $K_p$=2, the first SRS subframe n+k configured for the UE that satisfies k≥$K_p$ is subframe n+3, which is configured for legacy SRS transmission. So the UE transmits a legacy SRS at subframe n+3. At subframe m, the UE receives another SRS trigger in DCI, and the first SRS subframe m+k configured for the UE that satisfies k≥$K_p$ is subframe m+3. The UE then transmits a Release 16 SRS at subframe m+3. As illustrated in the example, whether a legacy or Release 16 SRS is transmitted after receiving an SRS trigger in DCI is determined by the first available SRS subframe, n+k, for the UE that satisfying k≥$K_p$. If the first available SRS subframe n+k is configured for legacy SRS, then a legacy SRS is transmitted. Otherwise, a Release 16 SRS is transmitted.

In some specific embodiments, to ensure that the legacy SRS and Release 16 SRS have different SRS normal UL subframe allocations, the legacy SRS and the Release 16 SRS can have the same the periodicity but different subframe offsets.

In some further specific embodiments, the periodicity of Release 16 SRS can be a positive integer multiple of the periodicity of the legacy SRS. In some such embodiments, the Release 16 SRS subframe configuration and legacy SRS subframe configuration have different subframe offsets so as to ensure that legacy and Release 16 SRS subframes never collide. In some other embodiments, the subframe offset is the same for the legacy and Release 16 SRS subframe configurations, but when the Release 16 and legacy subframes collide, the Release 16 subframe configuration has priority. That is, if the said positive integer multiple is N, every Nth SRS subframe will be a Release 16 SRS subframe while the remaining N−1 SRS subframes will be legacy SRS subframes. In another embodiment, when the Release 16 and legacy SRS subframes collide, the legacy SRS subframe configuration has priority.

In yet other specific embodiments, the subframe allocations for legacy and Release 16 SRS are allowed to be independently configured to ensure maximum flexibility, but a rule is defined to handle the behavior when legacy and Release 16 subframes collide. One example of such a rule is that the colliding subframe is classified as a Release 16 SRS subframe. Another example is that the colliding subframe is classified as a legacy SRS subframe. In other examples, the subframe is classified depending on which of the colliding subframe configurations has the largest periodicity.

Figure 9:
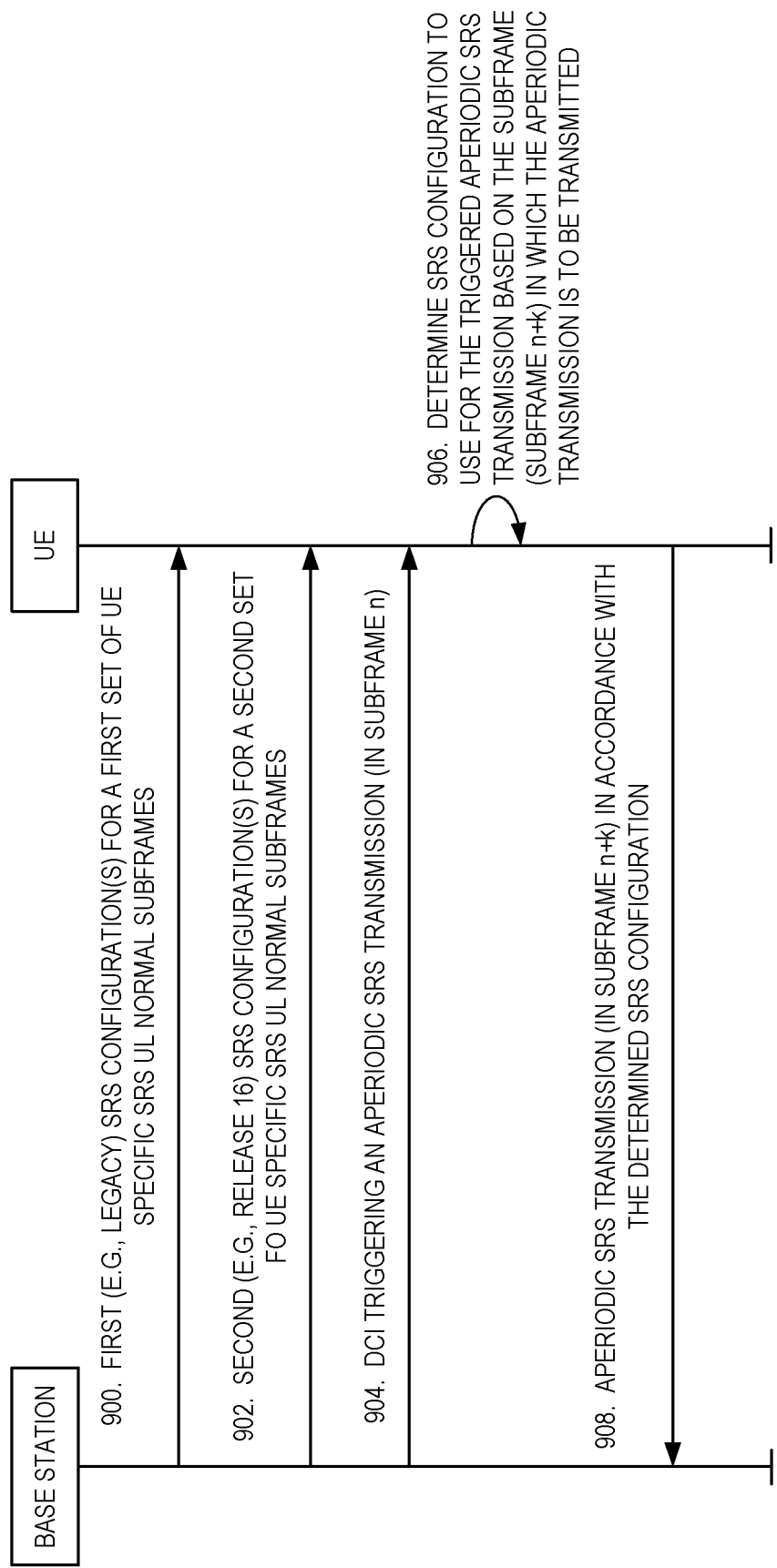
FIG. 9 illustrates the operation of a base station and a UE in accordance with at least some of the aspects of the first embodiment of the present disclosure.

FIG. 9 illustrates the operation of a base station (e.g., an LTE eNB) and a UE in accordance with at least some of the aspects of Embodiment 1 described above. As illustrated, a base station configures a UE with a first SRS configuration for a first type of aperiodic SRS, which in this example is legacy aperiodic SRS (step 900). This first SRS configuration is for a first set of UE-specific SRS UL normal subframes. The base station also configures the UE with a second SRS configuration for a second type of aperiodic SRS, which in this example is Release 16 aperiodic SRS (step 902). This second SRS configuration is for a second set of UE-specific SRS UL normal subframes.

The base station sends, to the UE, DCI triggering aperiodic SRS (step 904). The DCI includes a parameter, which in this example is an SRS request field, that is used regardless of whether the request is for the first or second aperiodic SRS type (e.g., the SRS request field is one bit for DCI format 0/2B/2C/2D and two bits in DCI format 4/4A/4B regardless of whether legacy or Release 16 aperiodic SRS is being requested). Whether Release 16 SRS or legacy SRS is triggered depends on the UE-specific SRS UL normal subframe in which the aperiodic SRS is triggered.

In this regard, the UE determines the SRS configuration to use for the triggered aperiodic SRS transmission based on the subframe in which the aperiodic SRS transmission is to be transmitted (step 906). For instance, in some embodiments, the DCI is received in subframe n, and the aperiodic SRS transmission is to occur in subframe n+k. In this case, if subframe n+k is in the first set of UE-specific SRS UL normal subframes, then the UE determines that the first SRS configuration is to be used and, thus, that the first type of SRS is to be transmitted. On the other hand, if subframe n+k is in the second set of UE-specific SRS UL normal subframes, then the UE determines that the second SRS configuration is to be used and, thus, that the second type of SRS is to be transmitted. As discussed above, in some embodiments, there may be a collision (i.e., subframe n+k is a subframe that is in both the first set of UE-specific SRS UL normal subframes and the second set of UE-specific SRS UL normal subframes). In this case, the UE may then determine which of the SRS configurations to use based on, e.g., priority or some other criterion such as, e.g., periodicity of the two sets of UE-specific SRS UL normal subframes, as discussed above.

The UE then transmits SRS in accordance with the determined SRS configuration (step 908).

Embodiment 2: Higher Layer Parameter(s) for Switching Between Release 16 SRS and Legacy SRS In this embodiment, a Release 16 UE is configured with a higher layer parameter (e.g., a RRC parameter) to switch between aperiodic triggering of legacy SRS and Release 16 SRS. If the higher layer parameter is set to one value, then the DCI triggers the legacy SRS; and, if the higher layer parameter is set to another value, then the DCI triggers the Release 16 SRS.

In some specific embodiments, when multiple SRS configurations are configured for a UE, the higher layer parameter may be configured per SRS configuration (i.e., per legacy SRS configuration and per Release 16 SRS configuration), and it may activate one of the DCI formats. For example, the higher layer parameter included in the legacy SRS configuration can be set to indicate legacy SRS transmission when triggered using DCI format 0, while the higher layer parameter included in the Release 16 SRS configuration can be set to indicate that Release 16 SRS is not to be triggered by DCI format 0. In this example, when aperiodic SRS is triggered using DCI format 0, the UE interprets this as legacy SRS being triggered. In a counter-example, the higher layer parameter included in the legacy SRS configuration can be set to indicate that legacy SRS is not to be triggered by DCI format 0, while the higher layer parameter included in the Release 16 SRS configuration can be set to indicate that Release 16 SRS is triggered by DCI format 0. In this counter-example, when aperiodic SRS is triggered using DCI format 0, the UE interprets this as Release 16 SRS being triggered. Although the examples here are presented for DCI format 0, this embodiment can be easily extended to other DCI formats such as 1A, 2B, 2C, 2D, 6-0A, 6-1A, 7-0A, 7-1E, 7-1F, 7-1G, 4, 4A, 4B, and 7-0B.

This embodiment may for instance be particularly useful in the following scenario. Since one interesting use case for Release 16 multi-symbol SRS is to provide better SRS channel estimation performance for reciprocity-based DL precoding purposes, the eNB may configure the DL DCI formats such as 2B, 2C, and 2D to be associated with Release 16 SRS configurations, while the UL DCI formats such as 4A and 4B may be configured to be associated with the legacy SRS configuration. This is beneficial because the eNB can then trigger a multi-symbol SRS (which is used for DL precoder determination purposes) with the same DCI that scheduled the DL Physical Downlink Shared Channel (PDSCH). That is, the eNB does not have to send a UL DCI to trigger the SRS in this case, which potentially saves DCI overhead since the UE may not have UL data in its buffer. Conversely, when SRS needs to be triggered for UL link adaptation purpose, the eNB can trigger that SRS with the same UL DCI which also schedules the UL Physical Uplink Shared Channel (PUSCH), thereby no DL DCI needs to be transmitted for SRS request purposes. Since there is a higher layer mapping between each type of DCI and the associated SRS configuration which is suitable to be associated with each type of DCI, overhead and latency is optimized.

Figure 10:
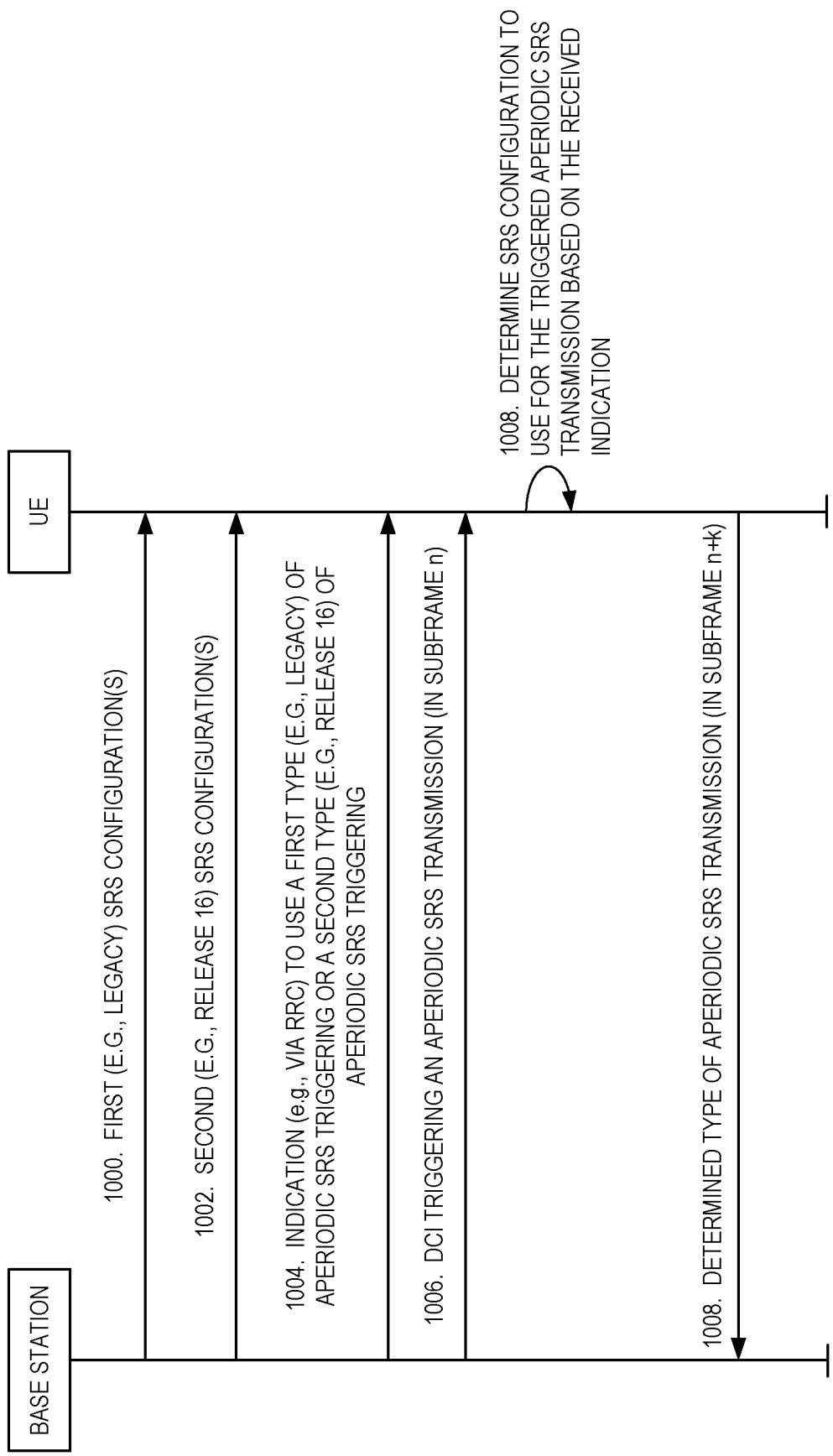
FIG. 10 illustrates the operation of a base station and a UE in accordance with at least some of the aspects a second embodiment of the present disclosure.

FIG. 10 illustrates the operation of a base station (e.g., an LTE eNB) and a UE in accordance with at least some of the aspects of Embodiment 2 described above. As illustrated, a base station configures a UE with a first SRS configuration(s) for a first type of aperiodic SRS, which in this example is legacy aperiodic SRS (step 1000). The base station also configures the UE with a second SRS configuration(s) for a second type of aperiodic SRS, which in this example is Release 16 aperiodic SRS (step 1002).

The base station sends, via higher layer signaling (e.g., RRC signaling), an indication to the UE to use either a first type of aperiodic SRS triggering (e.g., triggering for legacy SRS) or a second type of aperiodic SRS triggering (e.g., triggering for Release 16 SRS) (step 1004).

The base station sends, to the UE, DCI triggering aperiodic SRS (step 1006). The DCI includes a parameter, which in this example is an SRS request field, that is used regardless of whether the request is for the first or second aperiodic SRS type (e.g., the SRS request field is one bit for DCI format 0/2B/2C/2D and two bits in DCI format 4/4A/4B regardless of whether legacy or Release 16 aperiodic SRS is being requested). Whether Release 16 SRS or legacy SRS is triggered depends on the indication sent from the base station to the UE in step 1004.

In this regard, the UE determines the SRS configuration to use for the triggered aperiodic SRS transmission based on the indication received in step 1004 (step 1008). For instance, if the indication is an indication to use the first type of triggering, the UE determines to use the first SRS configuration(s) for the first type of SRS. On the other hand, if the indication is an indication to use the second type of triggering, the UE determines to use the second SRS configuration(s) for the second type of SRS. The UE then transmits SRS in accordance with the determined SRS configuration (step 1010).

Embodiment 3: Triggering a Mixture of Release 16 SRS and Legacy SRS Using DCI

In another embodiment, when more than one bit is used in a DCI format for SRS triggering, such as two bits in DCI format 4, then each of the multiple higher layer configured SRS configurations can be associated with either legacy or Release 16 SRS. When an SRS configuration is triggered, either the legacy or Release 16 SRS is transmitted depending on the value indicated in the bit field in DCI for SRS triggering. An example of associating an SRS configuration with either legacy or Release 16 SRS when more than one bit is used in a DCI for SRS triggering is shown in FIG. 11. In this example, if the bit field value indicates '01', then a legacy SRS corresponding to SRS configuration 1 is transmitted by the UE. If the bit field value indicates '11', then a Release 16 SRS corresponding to SRS configuration 3 is transmitted by the UE.

More precisely, the codepoints of the SRS request bit field in the DCI map to different higher layer configured SRS configurations. Each such SRS configuration can be either a legacy or Release 16 SRS configuration. This may be achieved for instance by assigning each SRS configuration (whether legacy or Release 16) an SRS configuration Identity (ID) (which may be an integer) and then referring to the SRS configuration IDs in the SRS trigger state definition. Alternatively, the each trigger state may be defined as a new RRC Information Element (IE) with a CHOICE structure, where one bit in the ASN.1 code indicates if the IE is of either "legacy SRS configuration type" or "Release 16 SRS configuration type".

A benefit of this embodiment is that the eNB can, for each possible SRS occasion, choose if it wants to trigger a legacy or a Release 16 SRS without having to wait for specific subframes for each of the dedicated types. For instance, the eNB may, depending on the current traffic load at the time of SRS triggering, choose if it intends to schedule Multi-User Multiple Input Multiple Output (MU-MIMO) which may require higher SRS Signal to Interference plus Noise Ratio (SINR) and therefore be motivated to trigger a Release 16 multi-symbol SRS or intended to schedule Single-User Multiple Input Multiple Output (SU-MIMO) which may require comparably lower SRS SINR whereby a legacy single-symbol SRS may be sufficient.

Figure 12:
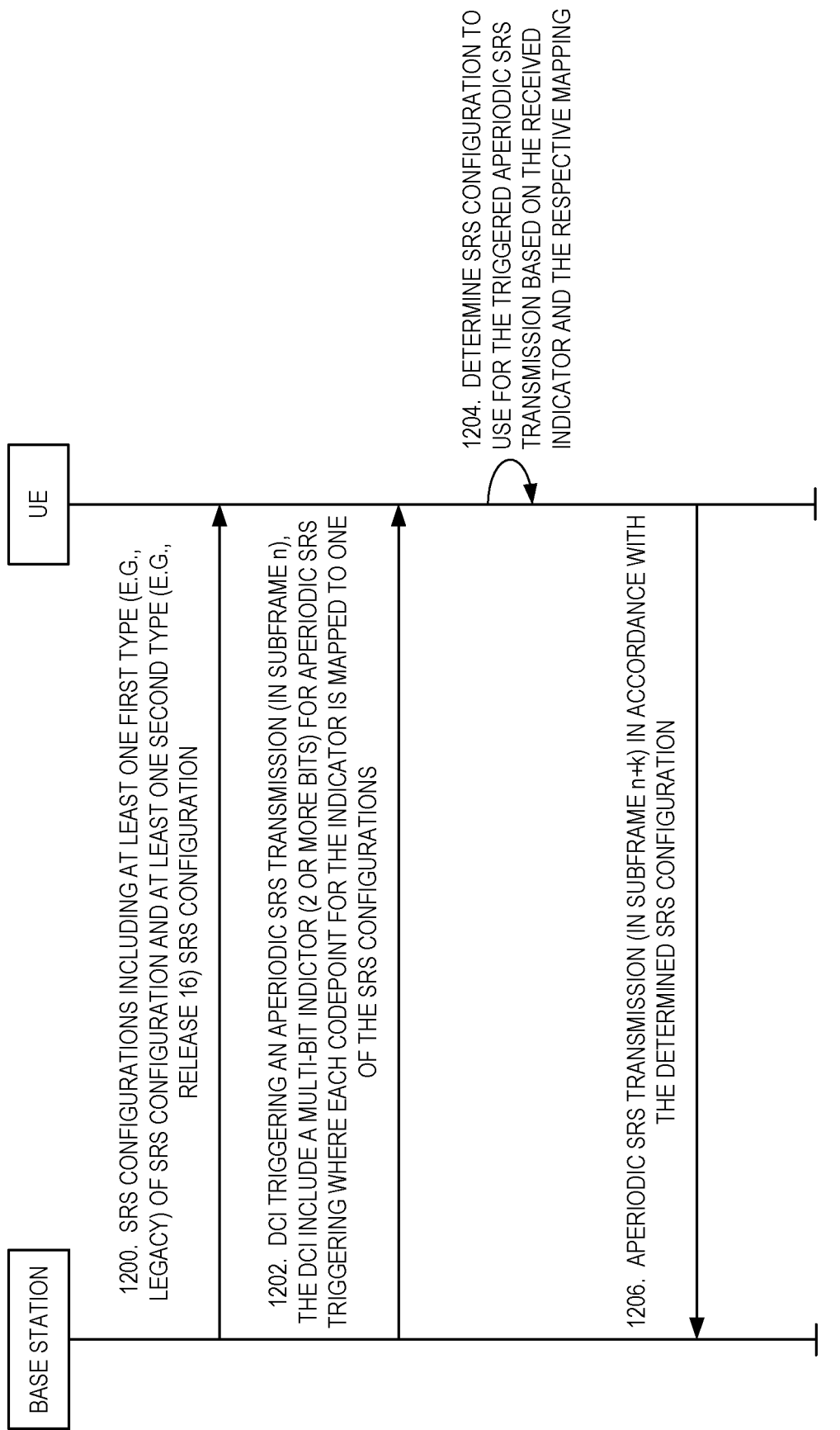
FIG. 12 illustrates the operation of a base station and a UE in accordance with at least some of the aspects the third embodiment of the present disclosure.

FIG. 12 illustrates the operation of a base station (e.g., an LTE eNB) and a UE in accordance with at least some of the aspects of Embodiment 3 described above. As illustrated, a base station configures a UE with two or more SRS configurations including at least one first type of SRS configuration for a first type of aperiodic SRS, which in this example is legacy aperiodic SRS, and at least one second type of SRS configuration for a second type of aperiodic SRS, which in this example is Release 16 aperiodic SRS (step 1200).

The base station sends, to the UE, DCI triggering aperiodic SRS (step 1202). The DCI includes a parameter, which in this example is an SRS request field, that is used regardless of whether the request is for the first or second aperiodic SRS type. In this embodiment, the SRS request field is a multi-bit parameter (i.e., includes two or more bits). Different values of the SRS request field (i.e., different codepoints or values of the two or more bits) are mapped to different ones of the SRS configurations. Whether Release 16 SRS or legacy SRS is triggered depends on the particular value of the bits in the SRS request field and the respective mapping from that particular value to a respective one of the SRS configurations.

In this regard, the UE determines the SRS configuration to use for the triggered aperiodic SRS transmission based on the value of the SRS request field and the respective mapping (step 1204). For instance, if the value of the SRS request field is mapped to an SRS configuration for the first type of SRS, the UE determines to use the SRS configurations for the first type of SRS. On the other hand, if the value of the SRS request field is mapped to an SRS configuration for the second type of SRS, the UE determines to use the that SRS configuration for the second type of SRS. The UE then transmits SRS in accordance with the determined SRS configuration (step 1206).

Embodiment 4: MAC CE for Switching Between Release 16 SRS and Legacy SRS

In this embodiment, a MAC CE is used to signal which of legacy SRS or Release 16 SRS should be aperiodically triggered. If the MAC CE signals legacy SRS, then following the MAC CE signaling and when an aperiodic SRS is triggered using DCI, the UE interprets this as legacy SRS being triggered. If the MAC CE signals Release 16 SRS, then following MAC CE signaling and when an aperiodic SRS is triggered using DCI, the UE interprets this as Release 16 SRS being triggered.

Figure 13:
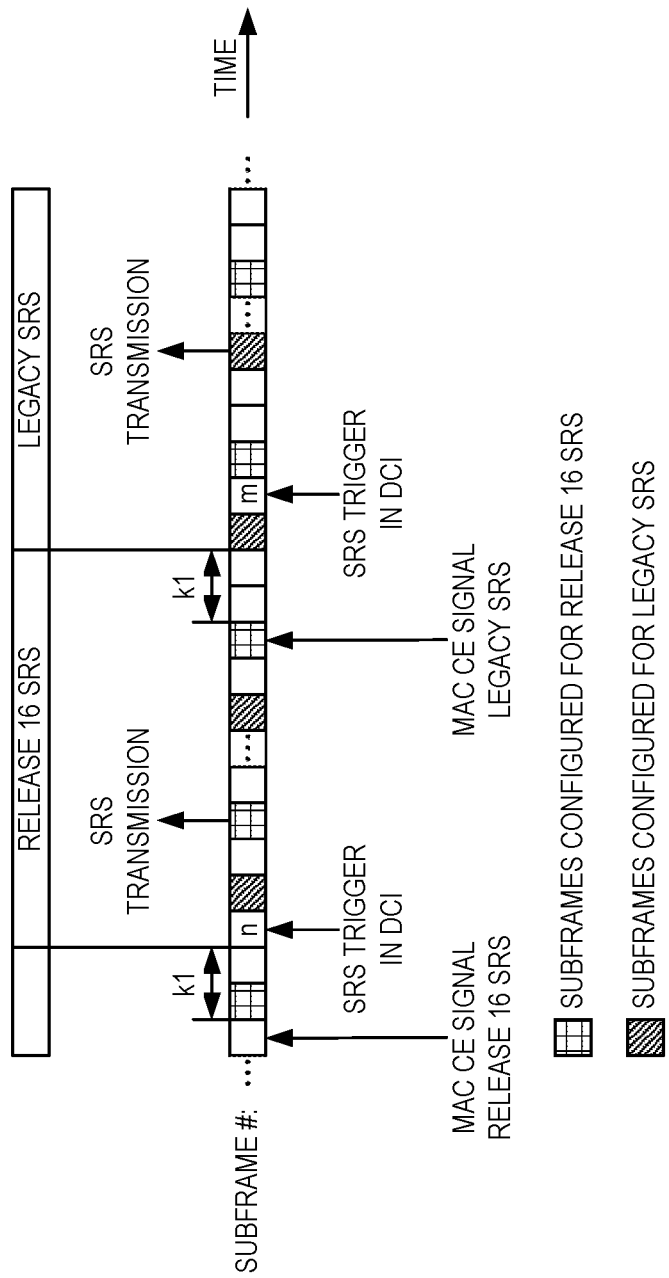
FIG. 13 illustrates an example of using Medium Access Control (MAC) Control Element (CE) signaling to switch between legacy and Release 16 SRS transmission in accordance with a fourth embodiment of the present disclosure.

An example of using MAC CE signaling to switch between legacy and Release 16 SRS transmission is shown in FIG. 13. At subframe n−3, a MAC CE is sent to a UE informing the UE to transmit Release 16 SRS when triggered by DCI starting from subframe n. The UE receives a DCI triggering SRS at subframe n. With $k_p$ being set to 2, the UE transmit a Release 16 SRS at a configured Release 16 SRS subframe n+3 (since k=3>$k_p$ and n+3 is a Release 16 SRS subframe). At subframe m−4, the UE receives another MAC CE informing the UE to use legacy SRS transmission starting from subframe m−1. At subframe m, the UE receives a DCI triggering SRS and the UE transmits a legacy SRS at subframe m+4 since k=4>$k_p$ and subframe m+4 is configured for legacy SRS transmission. The time k1 between a subframe over which a MAC CE message for SRS selection is received and the subframe over which the selected SRS type (i.e., either Release 16 SRS or legacy SRS) takes effect can be pre-specified so that a UE and eNB are always synchronized.

Figure 14:
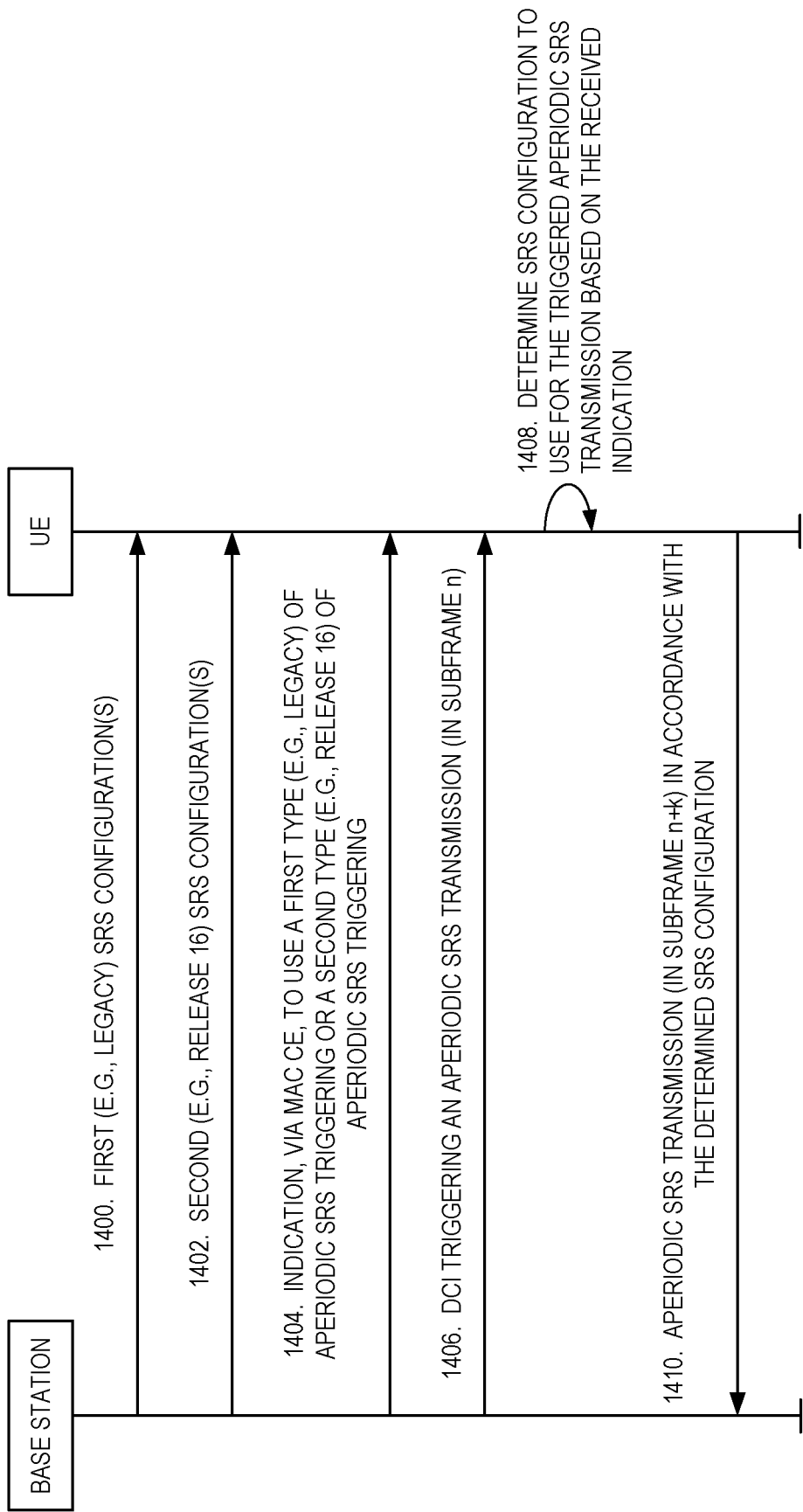
FIG. 14 illustrates the operation of a base station and a UE in accordance with at least some of the aspects the fourth embodiment of the present disclosure.

FIG. 14 illustrates the operation of a base station (e.g., an LTE eNB) and a UE in accordance with at least some of the aspects of Embodiment 4 described above. As illustrated, a base station configures a UE with a first SRS configuration(s) for a first type of aperiodic SRS, which in this example is legacy aperiodic SRS (step 1400). The base station also configures the UE with a second SRS configuration(s) for a second type of aperiodic SRS, which in this example is Release 16 aperiodic SRS (step 1402).

The base station sends, via a MAC CE (or other lower layer signaling) an indication to the UE to use either a first type of aperiodic SRS triggering (e.g., triggering for legacy SRS) or a second type of aperiodic SRS triggering (e.g., triggering for Release 16 SRS) (step 1404).

The base station sends, to the UE, DCI triggering aperiodic SRS (step 1406). The DCI includes a parameter, which in this example is an SRS request field, that is used regardless of whether the request is for the first or second aperiodic SRS type (e.g., the SRS request field is one bit for DCI format 0/2B/2C/2D and two bits in DCI format 4/4A/4B regardless of whether legacy or Release 16 aperiodic SRS is being requested). Whether Release 16 SRS or legacy SRS is triggered depends on the indication sent from the base station to the UE in step 1404.

In this regard, the UE determines the SRS configuration to use for the triggered aperiodic SRS transmission based on the indication received in step 1404 (step 1408). For instance, if the indication is an indication to use the first type of triggering, the UE determines to use the first SRS configuration(s) for the first type of SRS. On the other hand, if the indication is an indication to use the second type of triggering, the UE determines to use the second SRS configuration(s) for the second type of SRS. The UE then transmits SRS in accordance with the determined SRS configuration (step 1410).

Yet in another embodiment, whether legacy SRS or the Release 16 SRS is transmitted is determined by the resource or Physical Downlink Control Channel (PDCCH) search space over which a PDCCH carrying the DCI with an SRS trigger is received. For example, if a DCI is received in a resource that belongs to UE-specific PDCCH search space, then legacy SRS is transmitted. Otherwise, if a DCI is received in a resource that belongs to a common PDCCH search space, the Release 16 SRS is transmitted.

Example System

Figure 15:
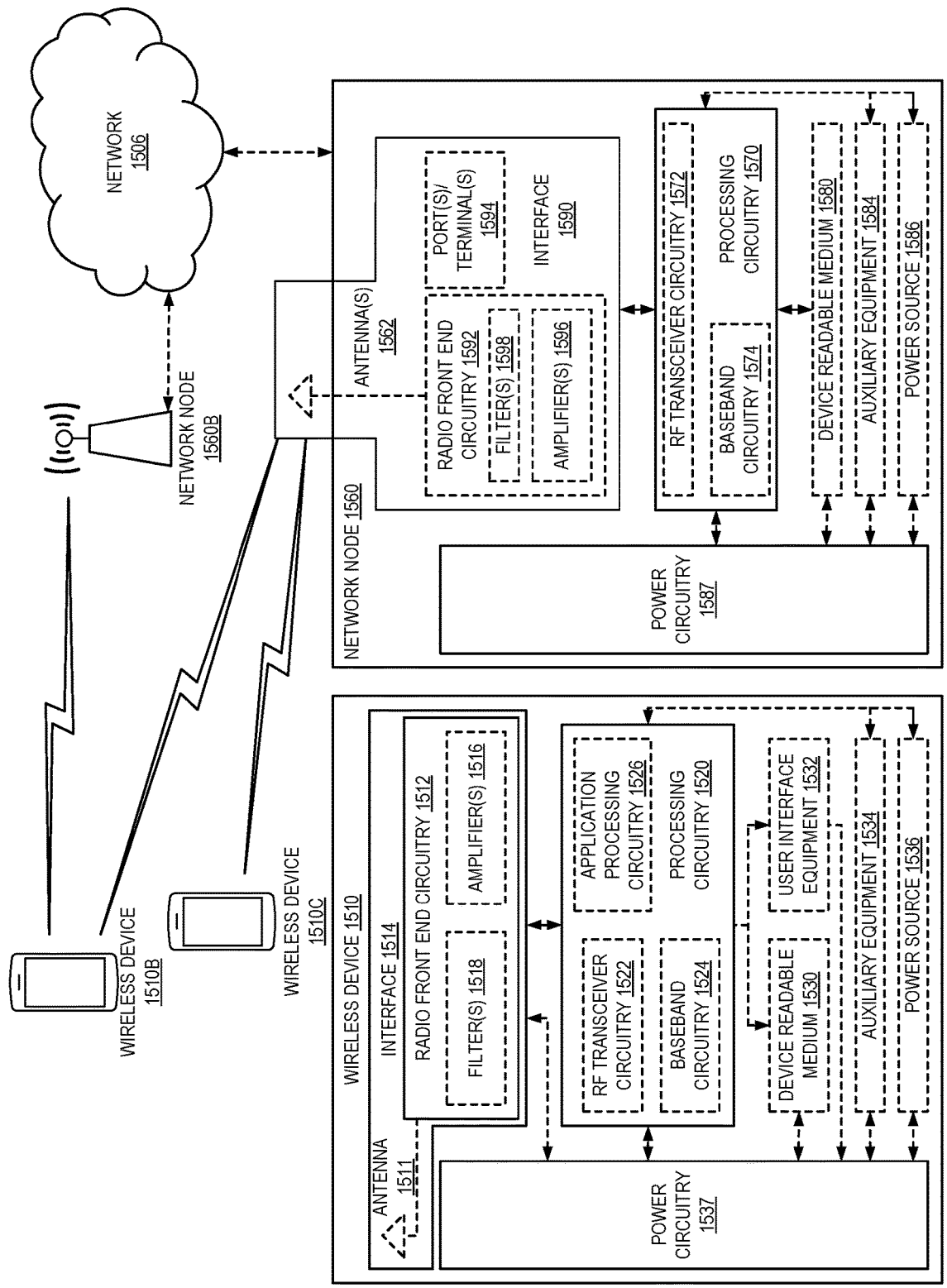
FIG. 15 illustrates one example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts a network 1506, network nodes 1560 and 1560B, and Wireless Devices (WDs) 1510, 1510B, and 1510C. In practice, a wireless network may further include any additional elements suitable to support communication between wireless devices or between a wireless device and another communication device, such as a landline telephone, a service provider, or any other network node or end device. Of the illustrated components, the network node 1560 and the WD 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as GSM, Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the WiMax, Bluetooth, Z-Wave, and/or ZigBee standards.

The network 1506 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 1560 and the WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, the network node 1560 includes processing circuitry 1570, a device readable medium 1580, an interface 1590, auxiliary equipment 1584, a power source 1586, power circuitry 1587, and an antenna 1562. Although the network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 1560 are depicted as single boxes located within a larger box, or nested within multiple boxes, in practice, a network node may comprise multiple different physical components that make up a single illustrated component (e.g., the device readable medium 1580 may comprise multiple separate hard drives as well as multiple Random Access Memory (RAM) modules).

Similarly, the network node 1560 may be composed of multiple physically separate components (e.g., a Node B component and a RNC component, or a BTS component and a BSC component, etc.), which may each have their own respective components. In certain scenarios in which the network node 1560 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1560 may be configured to support multiple Radio Access Technologies (RATs). In such embodiments, some components may be duplicated (e.g., a separate device readable medium 1580 for the different RATs) and some components may be reused (e.g., the same antenna 1562 may be shared by the RATs). The network node 1560 may also include multiple sets of the various illustrated components for different wireless technologies integrated into the network node 1560, such as, for example, GSM, WCDMA, LTE, NR, WiFi, or Bluetooth wireless technologies. These wireless technologies may be integrated into the same or a different chip or set of chips and other components within the network node 1560.

The processing circuitry 1570 is configured to perform any determining, calculating, or similar operations (e.g., certain obtaining operations) described herein as being provided by a network node. These operations performed by the processing circuitry 1570 may include processing information obtained by the processing circuitry 1570 by, for example, converting the obtained information into other information, comparing the obtained information or converted information to information stored in the network node, and/or performing one or more operations based on the obtained information or converted information, and as a result of said processing making a determination.

The processing circuitry 1570 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 1560 components, such as the device readable medium 1580, network node 1560 functionality. For example, the processing circuitry 1570 may execute instructions stored in the device readable medium 1580 or in memory within the processing circuitry 1570. Such functionality may include providing any of the various wireless features, functions, or benefits discussed herein. In some embodiments, the processing circuitry 1570 may include a System on a Chip (SOC).

In some embodiments, the processing circuitry 1570 may include one or more of Radio Frequency (RF) transceiver circuitry 1572 and baseband processing circuitry 1574. In some embodiments, the RF transceiver circuitry 1572 and the baseband processing circuitry 1574 may be on separate chips (or sets of chips), boards, or units, such as radio units and digital units. In alternative embodiments, part or all of the RF transceiver circuitry 1572 and the baseband processing circuitry 1574 may be on the same chip or set of chips, boards, or units.

In certain embodiments, some or all of the functionality described herein as being provided by a network node, base station, eNB, or other such network device may be performed by the processing circuitry 1570 executing instructions stored on the device readable medium 1580 or memory within the processing circuitry 1570. In alternative embodiments, some or all of the functionality may be provided by the processing circuitry 1570 without executing instructions stored on a separate or discrete device readable medium, such as in a hard-wired manner. In any of those embodiments, whether executing instructions stored on a device readable storage medium or not, the processing circuitry 1570 can be configured to perform the described functionality. The benefits provided by such functionality are not limited to the processing circuitry 1570 alone or to other components of the network node 1560, but are enjoyed by the network node 1560 as a whole, and/or by end users and the wireless network generally.

The device readable medium 1580 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1570. The device readable medium 1580 may store any suitable instructions; data or information, including a computer program; software; an application including one or more of logic, rules, code, tables, etc.; and/or other instructions capable of being executed by the processing circuitry 1570 and utilized by the network node 1560. The device readable medium 1580 may be used to store any calculations made by the processing circuitry 1570 and/or any data received via the interface 1590. In some embodiments, the processing circuitry 1570 and the device readable medium 1580 may be considered to be integrated.

The interface 1590 is used in the wired or wireless communication of signaling and/or data between the network node 1560, a network 1506, and/or WDs 1510. As illustrated, the interface 1590 comprises port(s)/terminal(s) 1594 to send and receive data, for example to and from the network 1506 over a wired connection. The interface 1590 also includes radio front end circuitry 1592 that may be coupled to, or in certain embodiments a part of, the antenna 1562. The radio front end circuitry 1592 comprises filters 1598 and amplifiers 1596. The radio front end circuitry 1592 may be connected to the antenna 1562 and the processing circuitry 1570. The radio front end circuitry 1592 may be configured to condition signals communicated between the antenna 1562 and the processing circuitry 1570. The radio front end circuitry 1592 may receive digital data that is to be sent out to other network nodes or WDs via a wireless connection. The radio front end circuitry 1592 may convert the digital data into a radio signal having the appropriate channel and bandwidth parameters using a combination of the filters 1598 and/or the amplifiers 1596. The radio signal may then be transmitted via the antenna 1562. Similarly, when receiving data, the antenna 1562 may collect radio signals which are then converted into digital data by the radio front end circuitry 1592. The digital data may be passed to the processing circuitry 1570. In other embodiments, the interface 1590 may comprise different components and/or different combinations of components.

In certain alternative embodiments, the network node 1560 may not include separate radio front end circuitry 1592; instead, the processing circuitry 1570 may comprise radio front end circuitry and may be connected to the antenna 1562 without separate radio front end circuitry 1592. Similarly, in some embodiments, all or some of the RF transceiver circuitry 1572 may be considered a part of the interface 1590. In still other embodiments, the interface 1590 may include the one or more ports or terminals 1594, the radio front end circuitry 1592, and the RF transceiver circuitry 1572 as part of a radio unit (not shown), and the interface 1590 may communicate with the baseband processing circuitry 1574, which is part of a digital unit (not shown).

The antenna 1562 may include one or more antennas, or antenna arrays, configured to send and/or receive wireless signals. The antenna 1562 may be coupled to the radio front end circuitry 1592 and may be any type of antenna capable of transmitting and receiving data and/or signals wirelessly. In some embodiments, the antenna 1562 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 1562 may be separate from the network node 1560 and may be connectable to the network node 1560 through an interface or port.

The antenna 1562, the interface 1590, and/or the processing circuitry 1570 may be configured to perform any receiving operations and/or certain obtaining operations described herein as being performed by a network node. Any information, data, and/or signals may be received from a WD, another network node, and/or any other network equipment. Similarly, the antenna 1562, the interface 1590, and/or the processing circuitry 1570 may be configured to perform any transmitting operations described herein as being performed by a network node. Any information, data, and/or signals may be transmitted to a WD, another network node, and/or any other network equipment.

The power circuitry 1587 may comprise, or be coupled to, power management circuitry and is configured to supply the components of the network node 1560 with power for performing the functionality described herein. The power circuitry 1587 may receive power from the power source 1586. The power source 1586 and/or the power circuitry 1587 may be configured to provide power to the various components of the network node 1560 in a form suitable for the respective components (e.g., at a voltage and current level needed for each respective component). The power source 1586 may either be included in, or be external to, the power circuitry 1587 and/or the network node 1560. For example, the network node 1560 may be connectable to an external power source (e.g., an electricity outlet) via an input circuitry or interface such as an electrical cable, whereby the external power source supplies power to the power circuitry 1587. As a further example, the power source 1586 may comprise a source of power in the form of a battery or battery pack which is connected to, or integrated in, the power circuitry 1587. The battery may provide backup power should the external power source fail. Other types of power sources, such as photovoltaic devices, may also be used.

Alternative embodiments of the network node 1560 may include additional components beyond those shown in FIG. 15 that may be responsible for providing certain aspects of the network node's functionality, including any of the functionality described herein and/or any functionality necessary to support the subject matter described herein. For example, the network node 1560 may include user interface equipment to allow input of information into the network node 1560 and to allow output of information from the network node 1560. This may allow a user to perform diagnostic, maintenance, repair, and other administrative functions for the network node 1560.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a MTC device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 15, a WD 1510 includes an antenna 1511, an interface 1514, processing circuitry 1520, a device readable medium 1530, user interface equipment 1532, auxiliary equipment 1534, a power source 1536, and power circuitry 1537. The WD 1510 may include multiple sets of one or more of the illustrated components for different wireless technologies supported by the WD 1510, such as, for example, GSM, WCDMA, LTE, NR, WiFi, WiMAX, or Bluetooth wireless technologies, just to mention a few. These wireless technologies may be integrated into the same or different chips or set of chips as other components within the WD 1510.

The antenna 1511 may include one or more antennas or antenna arrays configured to send and/or receive wireless signals and is connected to the interface 1514. In certain alternative embodiments, the antenna 1511 may be separate from the WD 1510 and be connectable to the WD 1510 through an interface or port. The antenna 1511, the interface 1514, and/or the processing circuitry 1520 may be configured to perform any receiving or transmitting operations described herein as being performed by a WD. Any information, data, and/or signals may be received from a network node and/or another WD. In some embodiments, radio front end circuitry and/or the antenna 1511 may be considered an interface.

As illustrated, the interface 1514 comprises radio front end circuitry 1512 and the antenna 1511. The radio front end circuitry 1512 comprises one or more filters 1518 and amplifiers 1516. The radio front end circuitry 1512 is connected to the antenna 1511 and the processing circuitry 1520 and is configured to condition signals communicated between the antenna 1511 and the processing circuitry 1520.

The radio front end circuitry 1512 may be coupled to or be a part of the antenna 1511. In some embodiments, the WD 1510 may not include separate radio front end circuitry 1512; rather, the processing circuitry 1520 may comprise radio front end circuitry and may be connected to the antenna 1511. Similarly, in some embodiments, some or all of RF transceiver circuitry 1522 may be considered a part of the interface 1514. The radio front end circuitry 1512 may receive digital data that is to be sent out to other network nodes or WDs via a wireless connection. The radio front end circuitry 1512 may convert the digital data into a radio signal having the appropriate channel and bandwidth parameters using a combination of the filters 1518 and/or the amplifiers 1516. The radio signal may then be transmitted via the antenna 1511. Similarly, when receiving data, the antenna 1511 may collect radio signals which are then converted into digital data by the radio front end circuitry 1512. The digital data may be passed to the processing circuitry 1520. In other embodiments, the interface 1514 may comprise different components and/or different combinations of components.

The processing circuitry 1520 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 1510 components, such as the device readable medium 1530, WD 1510 functionality. Such functionality may include providing any of the various wireless features or benefits discussed herein. For example, the processing circuitry 1520 may execute instructions stored in the device readable medium 1530 or in memory within the processing circuitry 1520 to provide the functionality disclosed herein.

As illustrated, the processing circuitry 1520 includes one or more of the RF transceiver circuitry 1522, baseband processing circuitry 1524, and application processing circuitry 1526. In other embodiments, the processing circuitry 1520 may comprise different components and/or different combinations of components. In certain embodiments, the processing circuitry 1520 of the WD 1510 may comprise a SOC. In some embodiments, the RF transceiver circuitry 1522, the baseband processing circuitry 1524, and the application processing circuitry 1526 may be on separate chips or sets of chips. In alternative embodiments, part or all of the baseband processing circuitry 1524 and the application processing circuitry 1526 may be combined into one chip or set of chips, and the RF transceiver circuitry 1522 may be on a separate chip or set of chips. In still alternative embodiments, part or all of the RF transceiver circuitry 1522 and the baseband processing circuitry 1524 may be on the same chip or set of chips, and the application processing circuitry 1526 may be on a separate chip or set of chips. In yet other alternative embodiments, part or all of the RF transceiver circuitry 1522, the baseband processing circuitry 1524, and the application processing circuitry 1526 may be combined in the same chip or set of chips. In some embodiments, the RF transceiver circuitry 1522 may be a part of the interface 1514. The RF transceiver circuitry 1522 may condition RF signals for the processing circuitry 1520.

In certain embodiments, some or all of the functionality described herein as being performed by a WD may be provided by the processing circuitry 1520 executing instructions stored on the device readable medium 1530, which in certain embodiments may be a computer-readable storage medium. In alternative embodiments, some or all of the functionality may be provided by the processing circuitry 1520 without executing instructions stored on a separate or discrete device readable storage medium, such as in a hard-wired manner. In any of those particular embodiments, whether executing instructions stored on a device readable storage medium or not, the processing circuitry 1520 can be configured to perform the described functionality. The benefits provided by such functionality are not limited to the processing circuitry 1520 alone or to other components of the WD 1510, but are enjoyed by the WD 1510 as a whole, and/or by end users and the wireless network generally.

The processing circuitry 1520 may be configured to perform any determining, calculating, or similar operations (e.g., certain obtaining operations) described herein as being performed by a WD. These operations, as performed by the processing circuitry 1520, may include processing information obtained by the processing circuitry 1520 by, for example, converting the obtained information into other information, comparing the obtained information or converted information to information stored by the WD 1510, and/or performing one or more operations based on the obtained information or converted information, and as a result of said processing making a determination.

The device readable medium 1530 may be operable to store a computer program; software; an application including one or more of logic, rules, code, tables, etc.; and/or other instructions capable of being executed by the processing circuitry 1520. The device readable medium 1530 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 1520. In some embodiments, the processing circuitry 1520 and the device readable medium 1530 may be considered to be integrated.

The user interface equipment 1532 may provide components that allow for a human user to interact with the WD 1510. Such interaction may be of many forms, such as visual, audial, tactile, etc. The user interface equipment 1532 may be operable to produce output to the user and to allow the user to provide input to the WD 1510. The type of interaction may vary depending on the type of user interface equipment 1532 installed in the WD 1510. For example, if the WD 1510 is a smart phone, the interaction may be via a touch screen; if the WD 1510 is a smart meter, the interaction may be through a screen that provides usage (e.g., the number of gallons used) or a speaker that provides an audible alert (e.g., if smoke is detected). The user interface equipment 1532 may include input interfaces, devices and circuits, and output interfaces, devices and circuits. The user interface equipment 1532 is configured to allow input of information into the WD 1510, and is connected to the processing circuitry 1520 to allow the processing circuitry 1520 to process the input information. The user interface equipment 1532 may include, for example, a microphone, a proximity or other sensor, keys/buttons, a touch display, one or more cameras, a Universal Serial Bus (USB) port, or other input circuitry. The user interface equipment 1532 is also configured to allow output of information from the WD 1510 and to allow the processing circuitry 1520 to output information from the WD 1510. The user interface equipment 1532 may include, for example, a speaker, a display, vibrating circuitry, a USB port, a headphone interface, or other output circuitry. Using one or more input and output interfaces, devices, and circuits of the user interface equipment 1532, the WD 1510 may communicate with end users and/or the wireless network, and allow them to benefit from the functionality described herein.

The auxiliary equipment 1534 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 1534 may vary depending on the embodiment and/or scenario.

The power source 1536 may, in some embodiments, be in the form of a battery or battery pack. Other types of power sources, such as an external power source (e.g., an electricity outlet), photovoltaic devices, or power cells may also be used. The WD 1510 may further comprise the power circuitry 1537 for delivering power from the power source 1536 to the various parts of the WD 1510 which need power from the power source 1536 to carry out any functionality described or indicated herein. The power circuitry 1537 may in certain embodiments comprise power management circuitry. The power circuitry 1537 may additionally or alternatively be operable to receive power from an external power source, in which case the WD 1510 may be connectable to the external power source (such as an electricity outlet) via input circuitry or an interface such as an electrical power cable. The power circuitry 1537 may also in certain embodiments be operable to deliver power from an external power source to the power source 1536. This may be, for example, for the charging of the power source 1536. The power circuitry 1537 may perform any formatting, converting, or other modification to the power from the power source 1536 to make the power suitable for the respective components of the WD 1510 to which power is supplied.

Figure 16:
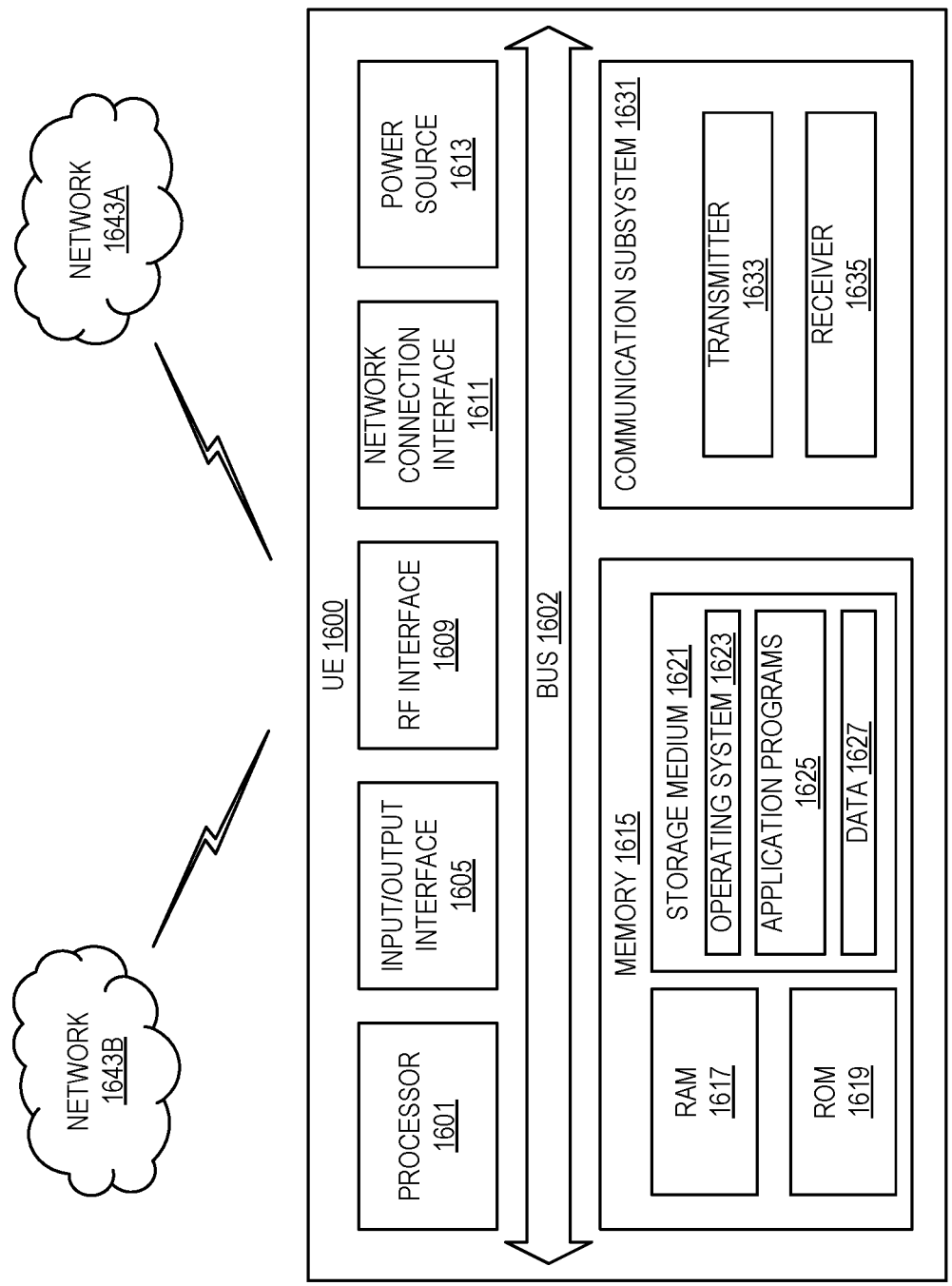
FIG. 16 illustrates one embodiment of a UE in accordance with various aspects of the present disclosure.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1600 may be any UE identified by 3GPP, including a NB-IoT UE, a MTC UE, and/or an enhanced MTC (eMTC) UE. The UE 1600, as illustrated in FIG. 16, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, the UE 1600 includes processing circuitry 1601 that is operatively coupled to an input/output interface 1605, an RF interface 1609, a network connection interface 1611, memory 1615 including RAM 1617, ROM 1619, and a storage medium 1621 or the like, a communication subsystem 1631, a power source 1613, and/or any other component, or any combination thereof. The storage medium 1621 includes an operating system 1623, an application program 1625, and data 1627. In other embodiments, the storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, the processing circuitry 1601 may be configured to process computer instructions and data. The processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1601 may include two CPUs. Data may be information in a form suitable for use by a computer.

In the depicted embodiment, the input/output interface 1605 may be configured to provide a communication interface to an input device, output device, or input and output device. The UE 1600 may be configured to use an output device via the input/output interface 1605. An output device may use the same type of interface port as an input device. For example, a USB port may be used to provide input to and output from the UE 1600. The output device may be a speaker, a sound card, a video card, a display, a monitor, a printer, an actuator, an emitter, a smartcard, another output device, or any combination thereof. The UE 1600 may be configured to use an input device via the input/output interface 1605 to allow a user to capture information into the UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, the RF interface 1609 may be configured to provide a communication interface to RF components such as a transmitter, a receiver, and an antenna. The network connection interface 1611 may be configured to provide a communication interface to a network 1643A. The network 1643A may encompass wired and/or wireless networks such as a LAN, a WAN, a computer network, a wireless network, a telecommunications network, another like network or any combination thereof. For example, the network 1643A may comprise a WiFi network. The network connection interface 1611 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1611 may implement receiver and transmitter functionality appropriate to the communication network links (e.g., optical, electrical, and the like). The transmitter and receiver functions may share circuit components, software, or firmware, or alternatively may be implemented separately.

The RAM 1617 may be configured to interface via a bus 1602 to the processing circuitry 1601 to provide storage or caching of data or computer instructions during the execution of software programs such as the operating system, application programs, and device drivers. The ROM 1619 may be configured to provide computer instructions or data to the processing circuitry 1601. For example, the ROM 1619 may be configured to store invariant low-level system code or data for basic system functions such as basic Input and Output (I/O), startup, or reception of keystrokes from a keyboard that are stored in a non-volatile memory. The storage medium 1621 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1621 may be configured to include the operating system 1623, the application program 1625 such as a web browser application, a widget or gadget engine, or another application, and the data file 1627. The storage medium 1621 may store, for use by the UE 1600, any of a variety of various operating systems or combinations of operating systems.

The storage medium 1621 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1621 may allow the UE 1600 to access computer-executable instructions, application programs, or the like, stored on transitory or non-transitory memory media, to off-load data or to upload data. An article of manufacture, such as one utilizing a communication system, may be tangibly embodied in the storage medium 1621, which may comprise a device readable medium.

In FIG. 16, the processing circuitry 1601 may be configured to communicate with a network 1643B using the communication subsystem 1631. The network 1643A and the network 1643B may be the same network or networks or different network or networks. The communication subsystem 1631 may be configured to include one or more transceivers used to communicate with the network 1643B. For example, the communication subsystem 1631 may be configured to include one or more transceivers used to communicate with one or more remote transceivers of another device capable of wireless communication such as another WD, UE, or base station of a Radio Access Network (RAN) according to one or more communication protocols, such as IEEE 802.16, Code Division Multiple Access (CDMA), WCDMA, GSM, LTE, Universal Terrestrial RAN (UTRAN), WiMax, or the like. Each transceiver may include a transmitter 1633 and/or a receiver 1635 to implement transmitter or receiver functionality, respectively, appropriate to the RAN links (e.g., frequency allocations and the like). Further, the transmitter 1633 and the receiver 1635 of each transceiver may share circuit components, software, or firmware, or alternatively may be implemented separately.

In the illustrated embodiment, the communication functions of the communication subsystem 1631 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1631 may include cellular communication, WiFi communication, Bluetooth communication, and GPS communication. The network 1643B may encompass wired and/or wireless networks such as a LAN, a WAN, a computer network, a wireless network, a telecommunications network, another like network, or any combination thereof. For example, the network 1643B may be a cellular network, a WiFi network, and/or a near-field network. A power source 1613 may be configured to provide Alternating Current (AC) or Direct Current (DC) power to components of the UE 1600.

The features, benefits, and/or functions described herein may be implemented in one of the components of the UE 1600 or partitioned across multiple components of the UE 1600. Further, the features, benefits, and/or functions described herein may be implemented in any combination of hardware, software, or firmware. In one example, the communication subsystem 1631 may be configured to include any of the components described herein. Further, the processing circuitry 1601 may be configured to communicate with any of such components over the bus 1602. In another example, any of such components may be represented by program instructions stored in memory that, when executed by the processing circuitry 1601, perform the corresponding functions described herein. In another example, the functionality of any of such components may be partitioned between the processing circuitry 1601 and the communication subsystem 1631. In another example, the non-computationally intensive functions of any of such components may be implemented in software or firmware and the computationally intensive functions may be implemented in hardware.

Figure 17:
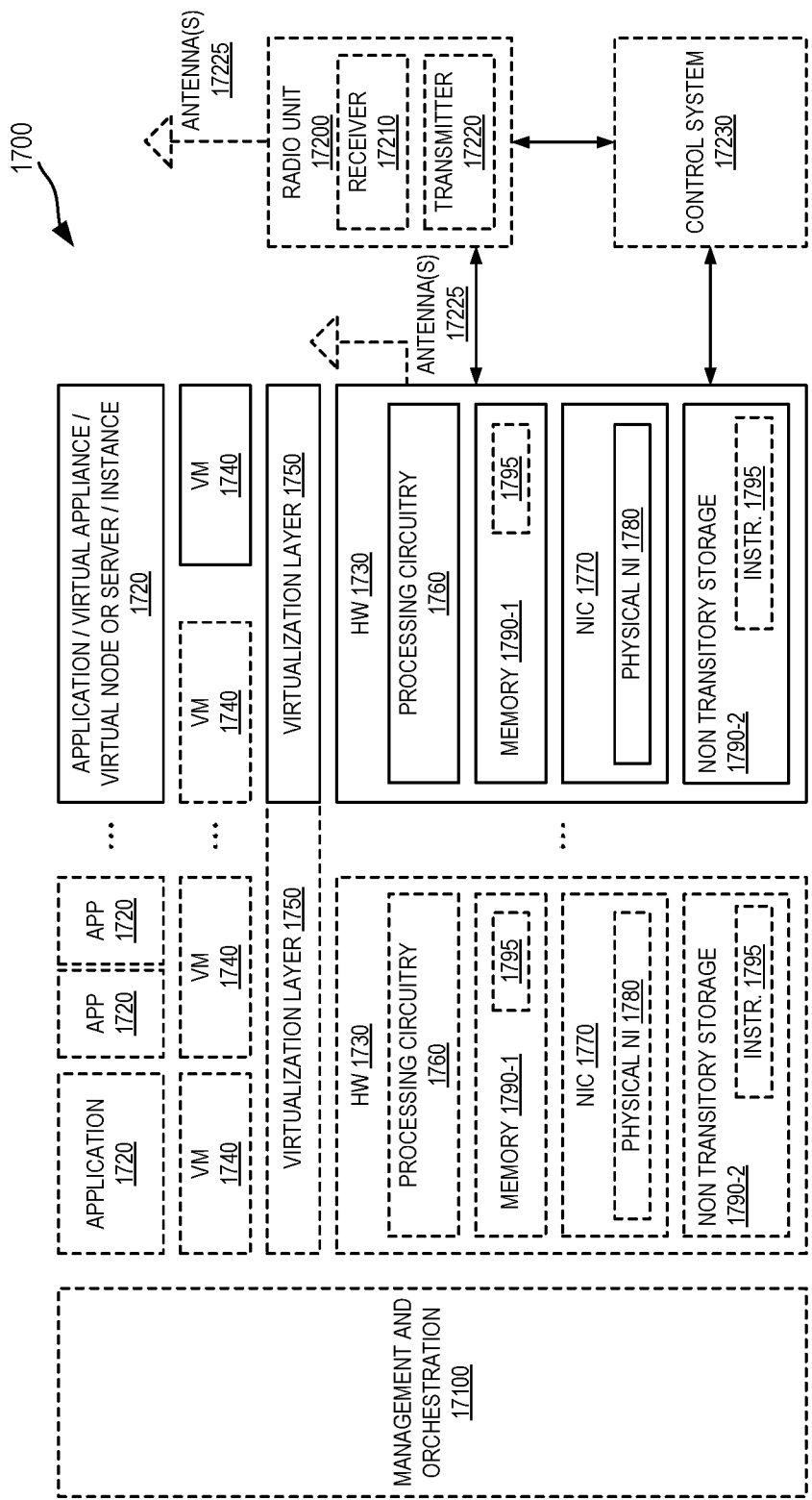
FIG. 17 is a schematic block diagram illustrating a virtualization environment in which functions implemented by some embodiments may be virtualized.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. The applications 1720 are run in the virtualization environment 1700 which provides hardware 1730 comprising processing circuitry 1760 and memory 1790. The memory 1790 contains instructions 1795 executable by the processing circuitry 1760 whereby the application 1720 is operative to provide one or more of the features, benefits, and/or functions disclosed herein.

The virtualization environment 1700 comprises general-purpose or special-purpose network hardware devices 1730 comprising a set of one or more processors or processing circuitry 1760, which may be Commercial Off-the-Shelf (COTS) processors, dedicated ASICs, or any other type of processing circuitry including digital or analog hardware components or special purpose processors. Each hardware device 1730 may comprise memory 1790-1 which may be non-persistent memory for temporarily storing instructions 1795 or software executed by the processing circuitry 1760. Each hardware device 1730 may comprise one or more Network Interface Controllers (NICs) 1770, also known as network interface cards, which include a physical network interface 1780. Each hardware device 1730 may also include non-transitory, persistent, machine-readable storage media 1790-2 having stored therein software 1795 and/or instructions executable by the processing circuitry 1760. The software 1795 may include any type of software including software for instantiating one or more virtualization layers 1750 (also referred to as hypervisors), software to execute virtual machines 1740, as well as software allowing it to execute functions, features, and/or benefits described in relation with some embodiments described herein.

The virtual machines 1740, comprise virtual processing, virtual memory, virtual networking or interface, and virtual storage, and may be run by a corresponding virtualization layer 1750 or hypervisor. Different embodiments of the instance of virtual appliance 1720 may be implemented on one or more of the virtual machines 1740, and the implementations may be made in different ways.

During operation, the processing circuitry 1760 executes the software 1795 to instantiate the hypervisor or virtualization layer 1750, which may sometimes be referred to as a Virtual Machine Monitor (VMM). The virtualization layer 1750 may present a virtual operating platform that appears like networking hardware to the virtual machine 1740.

As shown in FIG. 17, the hardware 1730 may be a standalone network node with generic or specific components. The hardware 1730 may comprise an antenna 17225 and may implement some functions via virtualization. Alternatively, the hardware 1730 may be part of a larger cluster of hardware (e.g., such as in a data center or CPE) where many hardware nodes work together and are managed via a Management and Orchestration (MANO) 17100, which, among others, oversees lifecycle management of the applications 1720.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1740 may be a software implementation of a physical machine that runs programs as if they were executing on a physical, non-virtualized machine. Each of the virtual machines 1740, and that part of the hardware 1730 that executes that virtual machine 1740, be it hardware dedicated to that virtual machine 1740 and/or hardware shared by that virtual machine 1740 with others of the virtual machines 1740, forms a separate Virtual Network Element (VNE).

Still in the context of NFV, Virtual Network Function (VNF) is responsible for handling specific network functions that run in one or more virtual machines 1740 on top of the hardware networking infrastructure 1730 and corresponds to the application 1720 in FIG. 17.

In some embodiments, one or more radio units 17200 that each include one or more transmitters 17220 and one or more receivers 17210 may be coupled to the one or more antennas 17225. The radio units 17200 may communicate directly with the hardware nodes 1730 via one or more appropriate network interfaces and may be used in combination with the virtual components to provide a virtual node with radio capabilities, such as a radio access node or a base station.

In some embodiments, some signaling can be effected with the use of a control system 17230, which may alternatively be used for communication between the hardware nodes 1730 and the radio unit 17200.

Figure 18:
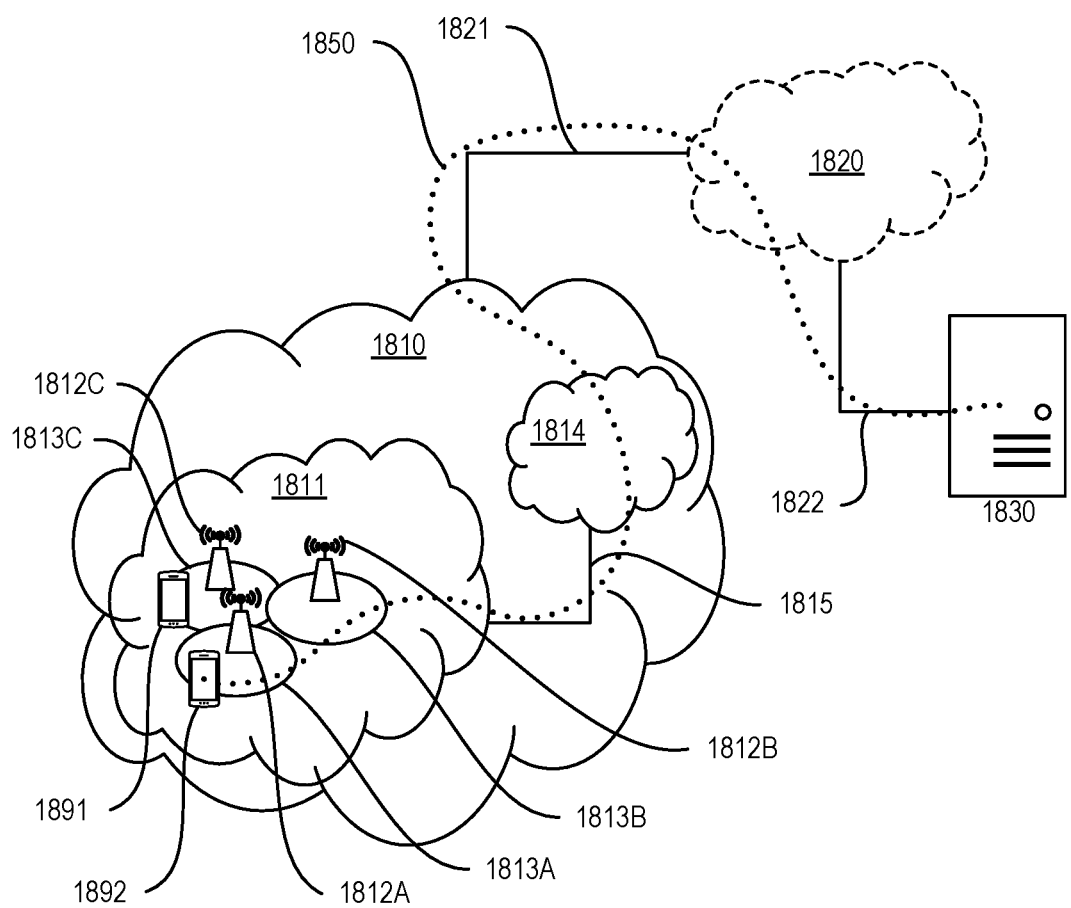
FIG. 18 illustrates one example of a communication system in accordance with an embodiment of the present disclosure.

With reference to FIG. 18, in accordance with an embodiment, a communication system includes a telecommunication network 1810, such as a 3GPP-type cellular network, which comprises an access network 1811, such as a RAN, and a core network 1814. The access network 1811 comprises a plurality of base stations 1812A, 1812B, 1812C, such as Node Bs, eNBs, gNBs, or other types of wireless APs, each defining a corresponding coverage area 1813A, 1813B, 1813C. Each base station 1812A, 1812B, 1812C is connectable to the core network 1814 over a wired or wireless connection 1815. A first UE 1891 located in coverage area 1813C is configured to wirelessly connect to, or be paged by, the corresponding base station 1812C. A second UE 1892 in coverage area 1813A is wirelessly connectable to the corresponding base station 1812A. While a plurality of UEs 1891, 1892 are illustrated in this example, the disclosed embodiments are equally applicable to a situation where a sole UE is in the coverage area or where a sole UE is connecting to the corresponding base station 1812.

The telecommunication network 1810 is itself connected to a host computer 1830, which may be embodied in the hardware and/or software of a standalone server, a cloud-implemented server, a distributed server, or as processing resources in a server farm. The host computer 1830 may be under the ownership or control of a service provider, or may be operated by the service provider or on behalf of the service provider. Connections 1821 and 1822 between telecommunication network 1810 and the host computer 1830 may extend directly from the core network 1814 to the host computer 1830 or may go via an optional intermediate network 1820. The intermediate network 1820 may be one of, or a combination of more than one of, a public, private, or hosted network; the intermediate network 1820, if any, may be a backbone network or the Internet; in particular, the intermediate network 1820 may comprise two or more sub-networks (not shown).

The communication system of FIG. 18 as a whole enables connectivity between the connected UEs 1891, 1892 and the host computer 1830. The connectivity may be described as an Over-the-Top (OTT) connection 1850. The host computer 1830 and the connected UEs 1891, 1892 are configured to communicate data and/or signaling via the OTT connection 1850, using the access network 1811, the core network 1814, any intermediate network 1820, and possible further infrastructure (not shown) as intermediaries. The OTT connection 1850 may be transparent in the sense that the participating communication devices through which the OTT connection 1850 passes are unaware of routing of uplink and downlink communications. For example, the base station 1812 may not or need not be informed about the past routing of an incoming downlink communication with data originating from the host computer 1830 to be forwarded (e.g., handed over) to a connected UE 1891. Similarly, the base station 1812 need not be aware of the future routing of an outgoing uplink communication originating from the UE 1891 towards the host computer 1830.

Example implementations, in accordance with an embodiment, of the UE, base station, and host computer discussed in the preceding paragraphs will now be described with reference to FIG. 19. In a communication system 1900, a host computer 1910 comprises hardware 1915 including a communication interface 1916 configured to set up and maintain a wired or wireless connection with an interface of a different communication device of the communication system 1900. The host computer 1910 further comprises processing circuitry 1918, which may have storage and/or processing capabilities. In particular, the processing circuitry 1918 may comprise one or more programmable processors, ASICs, FPGAs, or combinations of these (not shown) adapted to execute instructions. The host computer 1910 further comprises software 1911, which is stored in or accessible by the host computer 1910 and executable by the processing circuitry 1918. The software 1911 includes a host application 1912. The host application 1912 may be operable to provide a service to a remote user, such as a UE 1930 connecting via an OTT connection 1950 terminating at the UE 1930 and the host computer 1910. In providing the service to the remote user, the host application 1912 may provide user data which is transmitted using the OTT connection 1950.

The communication system 1900 further includes a base station 1920 provided in a telecommunication system and comprising hardware 1925 enabling it to communicate with the host computer 1910 and with the UE 1930. The hardware 1925 may include a communication interface 1926 for setting up and maintaining a wired or wireless connection with an interface of a different communication device of the communication system 1900, as well as a radio interface 1927 for setting up and maintaining at least a wireless connection 1970 with the UE 1930 located in a coverage area (not shown in FIG. 19) served by the base station 1920. The communication interface 1926 may be configured to facilitate a connection 1960 to the host computer 1910. The connection 1960 may be direct or it may pass through a core network (not shown in FIG. 19) of the telecommunication system and/or through one or more intermediate networks outside the telecommunication system. In the embodiment shown, the hardware 1925 of the base station 1920 further includes processing circuitry 1928, which may comprise one or more programmable processors, ASICs, FPGAs, or combinations of these (not shown) adapted to execute instructions. The base station 1920 further has software 1921 stored internally or accessible via an external connection.

The communication system 1900 further includes the UE 1930 already referred to. The UE's 1930 hardware 1935 may include a radio interface 1937 configured to set up and maintain a wireless connection 1970 with a base station serving a coverage area in which the UE 1930 is currently located. The hardware 1935 of the UE 1930 further includes processing circuitry 1938, which may comprise one or more programmable processors, ASICs, FPGAs, or combinations of these (not shown) adapted to execute instructions. The UE 1930 further comprises software 1931, which is stored in or accessible by the UE 1930 and executable by the processing circuitry 1938. The software 1931 includes a client application 1932. The client application 1932 may be operable to provide a service to a human or non-human user via the UE 1930, with the support of the host computer 1910. In the host computer 1910, the executing host application 1912 may communicate with the executing client application 1932 via the OTT connection 1950 terminating at the UE 1930 and the host computer 1910. In providing the service to the user, the client application 1932 may receive request data from the host application 1912 and provide user data in response to the request data. The OTT connection 1950 may transfer both the request data and the user data. The client application 1932 may interact with the user to generate the user data that it provides.

Figure 19:
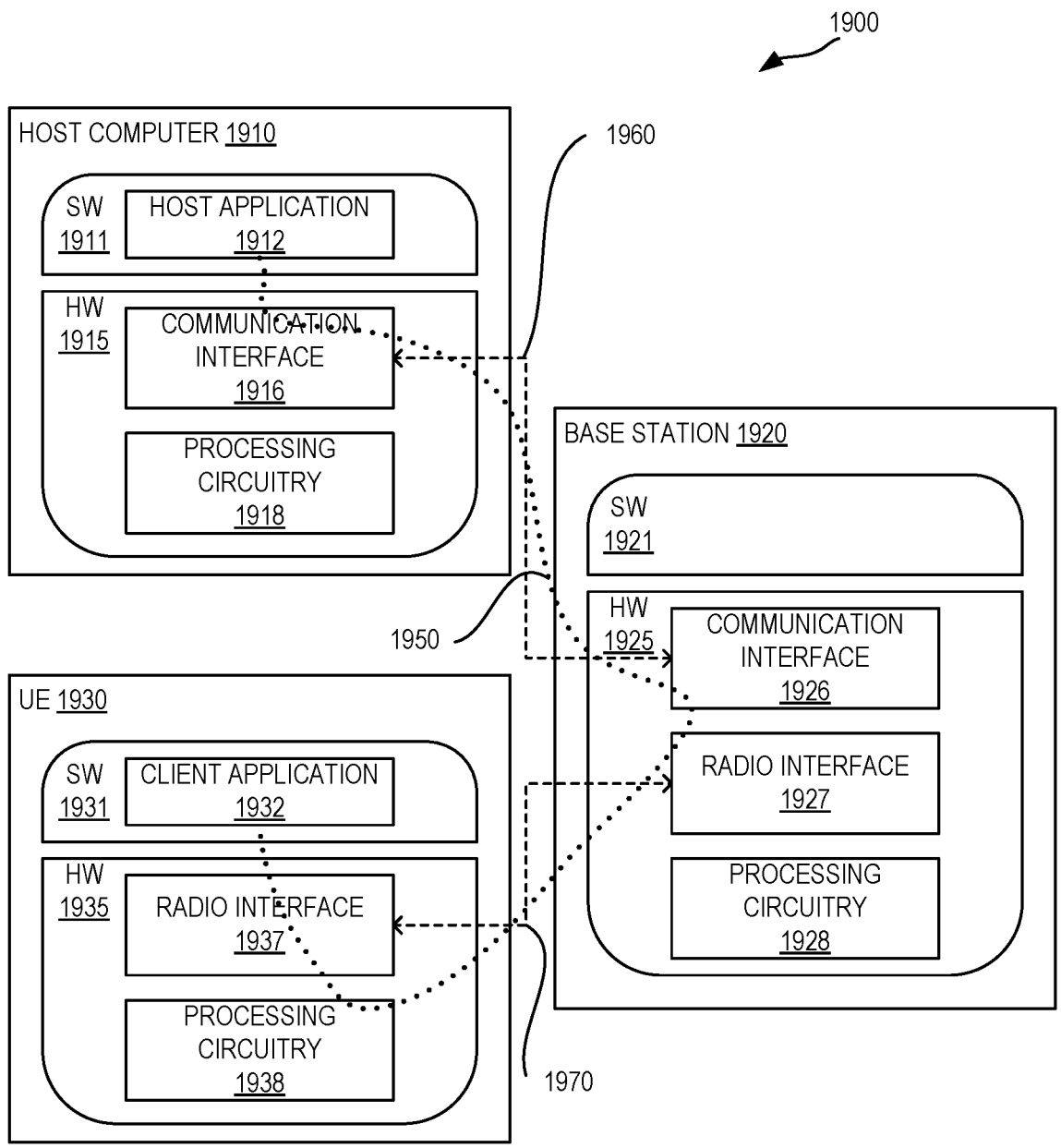
FIG. 19 illustrates example implementations of the base station, host computer, and UE of FIG. 18.

It is noted that the host computer 1910, the base station 1920, and the UE 1930 illustrated in FIG. 19 may be similar or identical to the host computer 1830, one of the base stations 1812A, 1812B, 1812C, and one of the UEs 1891, 1892 of FIG. 18, respectively. This is to say, the inner workings of these entities may be as shown in FIG. 19 and independently, the surrounding network topology may be that of FIG. 18.

In FIG. 19, the OTT connection 1950 has been drawn abstractly to illustrate the communication between the host computer 1910 and the UE 1930 via the base station 1920 without explicit reference to any intermediary devices and the precise routing of messages via these devices. The network infrastructure may determine the routing, which may be configured to hide from the UE 1930 or from the service provider operating the host computer 1910, or both. While the OTT connection 1950 is active, the network infrastructure may further take decisions by which it dynamically changes the routing (e.g., on the basis of load balancing consideration or reconfiguration of the network).

The wireless connection 1970 between the UE 1930 and the base station 1920 is in accordance with the teachings of the embodiments described throughout this disclosure. One or more of the various embodiments improve the performance of OTT services provided to the UE 1930 using the OTT connection 1950, in which the wireless connection 1970 forms the last segment. More precisely, the teachings of these embodiments may improve, e.g., the data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1950 between the host computer 1910 and the UE 1930, in response to variations in the measurement results. The measurement procedure and/or the network functionality for reconfiguring the OTT connection 1950 may be implemented in the software 1911 and the hardware 1915 of the host computer 1910 or in the software 1931 and the hardware 1935 of the UE 1930, or both. In some embodiments, sensors (not shown) may be deployed in or in association with communication devices through which the OTT connection 1950 passes; the sensors may participate in the measurement procedure by supplying values of the monitored quantities exemplified above, or supplying values of other physical quantities from which the software 1911, 1931 may compute or estimate the monitored quantities. The reconfiguring of the OTT connection 1950 may include message format, retransmission settings, preferred routing, etc.; the reconfiguring need not affect the base station 1920, and it may be unknown or imperceptible to the base station 1920. Such procedures and functionalities may be known and practiced in the art. In certain embodiments, measurements may involve proprietary UE signaling facilitating the host computer 1910's measurements of throughput, propagation times, latency, and the like. The measurements may be implemented in that the software 1911 and 1931 causes messages to be transmitted, in particular empty or 'dummy' messages, using the OTT connection 1950 while it monitors propagation times, errors, etc.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2010, the host computer provides user data. In sub-step 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2110 of the method, the host computer provides user data. In an optional sub-step (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In sub-step 2221 (which may be optional) of step 2220, the UE provides the user data by executing a client application. In sub-step 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in sub-step 2230 (which may be optional), transmission of the user data to the host computer. In step 2240 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 24:
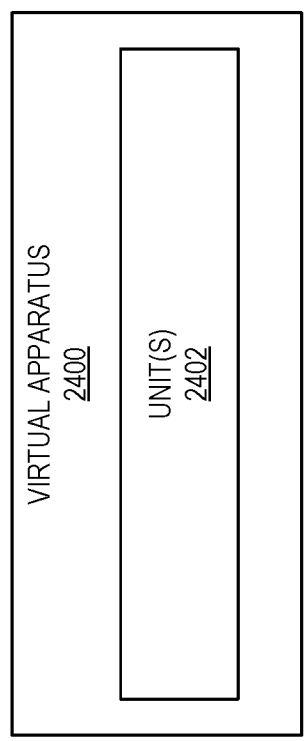
FIG. 24 illustrates a schematic block diagram of an apparatus in a wireless network in accordance with an embodiment of the present disclosure.

FIG. 24 illustrates a schematic block diagram of an apparatus 2400 in a wireless network (for example, the wireless network shown in FIG. 15). The apparatus may be implemented in a wireless device or network node (e.g., the WD 1510 or the network node 1560 shown in FIG. 15). The apparatus 2400 is operable to carry out any one of the examples methods described herein.

The virtual apparatus 2400 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause one or more unit(s) 2402, and any other suitable units of the apparatus 2400 to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some example embodiments of the present disclosure are as follows:

Embodiment 1: A method in a wireless device (e.g., a UE) for triggering aperiodic SRS, wherein the same DCI field is used to trigger a first SRS configuration and a second SRS configuration in normal UL subframes and wherein: the first SRS configuration consists of at least one of SRS transmission in the last SC-FDMA symbol of a normal UL subframe and SRS sequences generated from a physical cell ID; and the second SRS configuration consists of at least one of SRS transmission in more than one SC-FDMA symbol of a normal UL subframe and SRS sequences generated from a virtual cell ID.

Embodiment 2: The method of embodiment 1, wherein whether the first SRS configuration or the second SRS configuration is triggered is determined using the first available SRS subframe after receiving the aperiodic SRS trigger in DCI.

Embodiment 3: The method of any of embodiments 1-2, wherein the first SRS configuration is triggered if the first available SRS subframe is configured for SRS transmission corresponding to the first SRS configuration.

Embodiment 4: The method of any of embodiments 1-2, wherein the second SRS configuration is triggered if the first available SRS subframe is configured for SRS transmission corresponding to the second SRS configuration.

Embodiment 5: The method of embodiment 1, wherein whether the first SRS configuration or the second SRS configuration is triggered is determined based on a priority associated with the first SRS configuration or the second SRS configuration.

Embodiment 6: The method of embodiment 1, wherein whether the first SRS configuration or the second SRS configuration is triggered is determined using one or more higher layer parameters that indicates that one or more DCI formats can trigger one of the first SRS configuration or the second SRS configuration.

Embodiment 7: The method of embodiment 1, wherein whether the first SRS configuration or the second SRS configuration is triggered is determined using a value indicated in a DCI field for triggering SRS and the SRS configuration corresponding to the value indicated.

Embodiment 8: The method of embodiment 1, wherein whether the first SRS configuration or the second SRS configuration is triggered is determined using a MAC CE that indicates one of the first SRS configuration or the second SRS configuration.

Embodiment 9: A method in a wireless device (e.g., a UE) for triggering aperiodic SRS, comprising at least one of: receiving (900-902, 1000-1002, 1202, 1400-1402) at least one of a first SRS configuration for a first type of aperiodic SRS transmission and a second SRS configuration for a second type of aperiodic SRS transmission; receiving (904, 1006, 1202, 1406) downlink control information comprising a parameter for triggering an aperiodic SRS transmission; determining (906, 1008, 1204, 1408) whether to use the first SRS configuration or the second SRS configuration; and transmitting (908, 1010, 1206, 1410) an aperiodic SRS transmission in accordance with the determined SRS configuration.

Embodiment 10: The method of embodiment 1 wherein: the first SRS configuration is a configuration for transmission of: (a) an SRS transmission in a last SC-FDMA symbol of a normal UL subframe and/or (b) an SRS sequence generated from a physical cell ID; and the second SRS configuration is a configuration for transmission of: (a) an SRS transmission in more than one SC-FDMA symbol of a normal UL subframe and/or (b) an SRS sequence generated from a virtual cell ID.

Embodiment 11: The method of embodiment 9 or 10 wherein at least one of: the first SRS configuration is for a first set of wireless device specific SRS uplink normal subframes; the second SRS configuration is for a second set of wireless device specific uplink normal subframes; receiving (904, 1006, 1202, 1406) the downlink control information comprising the parameter for triggering an aperiodic SRS transmission comprises receiving (904, 1006, 1202, 1406) the downlink control information in a first subframe n to trigger an aperiodic SRS transmission in a second subframe n+k, and determining (906, 1008, 1204, 1408) whether to use the first SRS configuration or the second SRS configuration comprises determining (906) whether to use the first SRS configuration or the second SRS configuration based on whether the second subframe n+k is included in the first set of wireless device specific SRS uplink normal subframes or the second set of wireless device specific SRS uplink normal subframes.

Embodiment 12: The method of embodiment 11 wherein at least one of:
the first set of wireless device specific SRS uplink normal subframes and the second set of wireless device specific SRS uplink normal subframes are disjoint sets; and
determining (906) whether to use the first SRS configuration or the second SRS configuration based on whether the second subframe n+k is included in the first set of wireless device specific SRS uplink normal subframes or the second set of wireless device specific SRS uplink normal subframes comprises:
determining to use the first SRS configuration if the second subframe n+k is in the first set of wireless device specific SRS uplink normal subframes; and
determining to use the second SRS configuration if the second subframe n+k is in the second set of wireless device specific SRS uplink normal subframes.

Embodiment 13: The method of embodiment 11 wherein at least one of: the first set of wireless device specific SRS uplink normal subframes and the second set of wireless device specific SRS uplink normal subframes overlap; the second subframe n+k is included in both the first set of wireless device specific SRS uplink normal subframes and the second set of wireless device specific SRS uplink normal subframes; and determining (906) whether to use the first SRS configuration or the second SRS configuration based on whether the second subframe n+k is included in the first set of wireless device specific SRS uplink normal subframes or the second set of wireless device specific SRS uplink normal subframes comprises determining (906) whether to use the first SRS configuration or the second SRS configuration based on a predefined or preconfigured rule (e.g., based on a criterion such as priority or periodicity).

Embodiment 14: The method of embodiment 9 or 10 further comprising at least one of: receiving (1004, 1404) an indication to use an indicated type of aperiodic SRS triggering, the indicated type of aperiodic SRS triggering being a first type of aperiodic SRS triggering or a second type of aperiodic SRS triggering; wherein determining (906, 1008, 1204, 1408) whether to use the first SRS configuration or the second SRS configuration comprises determining (1008, 1408) whether to use the first SRS configuration or the second SRS configuration based on the indication.

Embodiment 15: The method of embodiment 14 wherein receiving (1004, 1404) the indication comprises receiving (1004) the indication via higher layer signaling (e.g., RRC signaling).

Embodiment 16: The method of embodiment 14 wherein receiving (1004, 1404) the indication comprises receiving (1404) the indication via a MAC CE.

Embodiment 17: The method of embodiment 9 or 10 wherein at least one of: the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; and determining (906, 1008, 1204, 1408) whether to use the first SRS configuration or the second SRS configuration comprises determining (1204) whether to use the first SRS configuration or the second SRS configuration based on the multi-bit parameter and the mappings between the first and second values of the parameter and the first and second SRS configurations.

Embodiment 18: The method of embodiment 9 or 10 wherein at least one of: the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; the value of the parameter comprised in the downlink control information for triggering an aperiodic SRS transmission is the first value; and determining (906, 1008, 1204, 1408) whether to use the first SRS configuration or the second SRS configuration comprises determining (1204) to use the first SRS configuration based on the value of the multi-bit parameter and the mapping between the first value of the parameter and the first SRS configuration.

Embodiment 19: The method of embodiment 9 or 10 wherein at least one of: the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; the value of the parameter comprised in the downlink control information for triggering an aperiodic SRS transmission is the second value; and determining (906, 1008, 1204, 1408) whether to use the first SRS configuration or the second SRS configuration comprises determining (1204) to use the second SRS configuration based on the value of the multi-bit parameter and the mapping between the second value of the parameter and the second SRS configuration.

Embodiment 20: The method of any of the previous embodiments, further comprising: providing user data; and forwarding the user data to a host computer via a transmission to a base station.

Embodiment 21: A method performed by a base station for triggering aperiodic SRS, comprising at least one of: transmitting (900-902, 1000-1002, 1202, 1400-1402), to a wireless device at least one of, a first SRS configuration for a first type of aperiodic SRS transmission and a second SRS configuration for a second type of aperiodic SRS transmission; transmitting (904, 1006, 1202, 1406), to the wireless device, downlink control information comprising a parameter for triggering an aperiodic SRS transmission; and receiving (908, 1010, 1206, 1410), from the wireless device, an aperiodic SRS transmission in accordance with one of the first and second SRS configurations.

Embodiment 22: The method of embodiment 21 wherein at least one of: the first SRS configuration is a configuration for transmission of: (a) an SRS transmission in a last SC-FDMA symbol of a normal UL subframe and/or (b) an SRS sequence generated from a physical cell ID; and the second SRS configuration is a configuration for transmission of: (a) an SRS transmission in more than one SC-FDMA symbol of a normal UL subframe and/or (b) an SRS sequence generated from a virtual cell ID.

Embodiment 23: The method of embodiment 21 or 22 wherein at least one of: the first SRS configuration is for a first set of wireless device specific SRS uplink normal subframes; the second SRS configuration is for a second set of wireless device specific uplink normal subframes; transmitting (904, 1006, 1202, 1406) the downlink control information comprising the parameter for triggering an aperiodic SRS transmission comprises transmitting (904, 1006, 1202, 1406) the downlink control information in a first subframe n to trigger an aperiodic SRS transmission in a second subframe n+k, and receiving (908, 1010, 1206, 1410), from the wireless device, the aperiodic SRS transmission in accordance with one of the first and second SRS configurations comprises receiving (908, 1010, 1206, 1410), from the wireless device, the aperiodic SRS transmission in accordance with one of the first and second SRS configurations as a function of whether the subframe n+k is included in the first set of wireless device specific SRS uplink normal subframes or the second set of wireless device specific SRS uplink normal subframes.

Embodiment 24: The method of embodiment 23 wherein at least one of:
the first set of wireless device specific SRS uplink normal subframes and the second set of wireless device specific SRS uplink normal subframes are disjoint sets; and
receiving (908, 1010, 1206, 1410), from the wireless device, the aperiodic SRS transmission in accordance with one of the first and second SRS configurations comprises:
receiving (908), from the wireless device, the aperiodic SRS transmission in accordance with the first SRS configuration if the second subframe n+k is in the first set of wireless device specific SRS uplink normal subframes; and
receiving (908), from the wireless device, the aperiodic SRS transmission in accordance with the second SRS configuration if the second subframe n+k is in the second set of wireless device specific SRS uplink normal subframes.

Embodiment 25: The method of embodiment 23 wherein at least one of: the first set of wireless device specific SRS uplink normal subframes and the second set of wireless device specific SRS uplink normal subframes overlap; the second subframe n+k is included in both the first set of wireless device specific SRS uplink normal subframes and the second set of wireless device specific SRS uplink normal subframes; and receiving (908, 1010, 1206, 1410), from the wireless device, the aperiodic SRS transmission in accordance with one of the first and second SRS configurations comprises receiving (908), from the wireless device, the aperiodic SRS transmission in accordance with one of the first and second SRS configurations in accordance with a predefined or preconfigured rule (e.g., based on a criterion such as priority or periodicity) that defines how collisions are to be handled.

Embodiment 26: The method of embodiment 21 or 22 further comprising at least one of: transmitting (1004, 1404), to the wireless device, an indication to use an indicated type of aperiodic SRS triggering, the indicated type of aperiodic SRS triggering being a first type of aperiodic SRS triggering or a second type of aperiodic SRS triggering; wherein receiving (908, 1010, 1206, 1410), from the wireless device, the aperiodic SRS transmission in accordance with one of the first and second SRS configurations comprises receiving (908), from the wireless device, the aperiodic SRS transmission in accordance with one of the first and second SRS configurations in accordance with the indication.

Embodiment 27: The method of embodiment 26 wherein transmitting (1004, 1404) the indication comprises transmitting (1004) the indication via higher layer signaling (e.g., RRC signaling).

Embodiment 28: The method of embodiment 26 wherein transmitting (1004, 1404) the indication comprises transmitting (1404) the indication via a MAC CE.

Embodiment 29: The method of embodiment 21 or 22 wherein: the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; and receiving (908, 1010, 1206, 1410), from the wireless device, the aperiodic SRS transmission in accordance with one of the first and second SRS configurations comprises receiving (908), from the wireless device, the aperiodic SRS transmission in accordance with the value of the parameter and the mappings between the first and second values of the parameter and the first and second SRS configurations.

Embodiment 30: The method of embodiment 21 or 22 wherein at least one of: the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; the value of the parameter comprised in the downlink control information for triggering an aperiodic SRS transmission is the first value; and receiving (908, 1010, 1206, 1410), from the wireless device, the aperiodic SRS transmission in accordance with one of the first and second SRS configurations comprises receiving (908), from the wireless device, the aperiodic SRS transmission in accordance with the mapping between the first value of the parameter and the first SRS configuration.

Embodiment 31: The method of embodiment 21 or 22 wherein at least one of: the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; the value of the parameter comprised in the downlink control information for triggering an aperiodic SRS transmission is the second value; and receiving (908, 1010, 1206, 1410), from the wireless device, the aperiodic SRS transmission in accordance with one of the first and second SRS configurations comprises receiving (908), from the wireless device, the aperiodic SRS transmission in accordance with the mapping between the second value of the parameter and the second SRS configuration.

Embodiment 32: The method of any of the previous embodiments, further comprising: obtaining user data; and forwarding the user data to a host computer or the wireless device.

Embodiment 33: A wireless device for triggering aperiodic SRS, the wireless device comprising: processing circuitry configured to perform any of the steps of any of embodiments 1 to 20; and power supply circuitry configured to supply power to the wireless device.

Embodiment 34: A base station for triggering aperiodic SRS, the base station comprising: processing circuitry configured to perform any of the steps of any of embodiments 21 to 32; and power supply circuitry configured to supply power to the base station.

Embodiment 35: A User Equipment, UE, for triggering aperiodic SRS, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 1 to 20; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 36: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of embodiments 21 to 32.

Embodiment 37: The communication system of the previous embodiment further including the base station.

Embodiment 38: The communication system of the previous 2 embodiments, further including the UE, wherein the UE is configured to communicate with the base station.

Embodiment 39: The communication system of the previous 3 embodiments, wherein: the processing circuitry of the host computer is configured to execute a host application, thereby providing the user data; and the UE comprises processing circuitry configured to execute a client application associated with the host application.

Embodiment 40: A method implemented in a communication system including a host computer, a base station and a User Equipment, UE, the method comprising: at the host computer, providing user data; and at the host computer, initiating a transmission carrying the user data to the UE via a cellular network comprising the base station, wherein the base station performs any of the steps of any of embodiments 21 to 32.

Embodiment 41: The method of the previous embodiment, further comprising, at the base station, transmitting the user data.

Embodiment 42: The method of the previous 2 embodiments, wherein the user data is provided at the host computer by executing a host application, the method further comprising, at the UE, executing a client application associated with the host application.

Embodiment 43: A User Equipment, UE, configured to communicate with a base station, the UE comprising a radio interface and processing circuitry configured to perform the method of the previous 3 embodiments.

Embodiment 44: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of embodiments 1 to 20.

Embodiment 45: The communication system of the previous embodiment, wherein the cellular network further includes a base station configured to communicate with the UE.

Embodiment 46: The communication system of the previous 2 embodiments, wherein: the processing circuitry of the host computer is configured to execute a host application, thereby providing the user data; and the UE's processing circuitry is configured to execute a client application associated with the host application.

Embodiment 47: A method implemented in a communication system including a host computer, a base station and a User Equipment, UE, the method comprising: at the host computer, providing user data; and at the host computer, initiating a transmission carrying the user data to the UE via a cellular network comprising the base station, wherein the UE performs any of the steps of any of embodiments 1 to 20.

Embodiment 48: The method of the previous embodiment, further comprising at the UE, receiving the user data from the base station.

Embodiment 49: A communication system including a host computer comprising: communication interface configured to receive user data originating from a transmission from a User Equipment, UE, to a base station, wherein the UE comprises a radio interface and processing circuitry, the UE's processing circuitry configured to perform any of the steps of any of embodiments 1 to 20.

Embodiment 50: The communication system of the previous embodiment, further including the UE.

Embodiment 51: The communication system of the previous 2 embodiments, further including the base station, wherein the base station comprises a radio interface configured to communicate with the UE and a communication interface configured to forward to the host computer the user data carried by a transmission from the UE to the base station.

Embodiment 52: The communication system of the previous 3 embodiments, wherein: the processing circuitry of the host computer is configured to execute a host application; and the UE's processing circuitry is configured to execute a client application associated with the host application, thereby providing the user data.

Embodiment 53: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 54: A method implemented in a communication system including a host computer, a base station and a User Equipment, UE, the method comprising: at the host computer, receiving user data transmitted to the base station from the UE, wherein the UE performs any of the steps of any of embodiments 1 to 20.

Embodiment 55: The method of the previous embodiment, further comprising, at the UE, providing the user data to the base station.

Embodiment 56: The method of the previous 2 embodiments, further comprising: at the UE, executing a client application, thereby providing the user data to be transmitted; and at the UE, executing a host application associated with the client application.

Embodiment 57: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 58: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of embodiments 21 to 32.

Embodiment 59: The communication system of the previous embodiment further including the base station.

Embodiment 60: The communication system of the previous 2 embodiments, further including the UE, wherein the UE is configured to communicate with the base station.

Embodiment 61: The communication system of the previous 3 embodiments, wherein: the processing circuitry of the host computer is configured to execute a host application; the UE is configured to execute a client application associated with the host application, thereby providing the user data to be received by the host computer.

Embodiment 62: A method implemented in a communication system including a host computer, a base station and a User Equipment, UE, the method comprising: at the host computer, receiving, from the base station, user data originating from a transmission which the base station has received from the UE, wherein the UE performs any of the steps of any of embodiments 1 to 20.

Embodiment 63: The method of the previous embodiment, further comprising at the base station, receiving the user data from the UE.

Embodiment 64: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
ACK Acknowledgment
AMF Access and Mobility Function
AP Access Point
ASIC Application Specific Integrated Circuit
ATM Asynchronous Transfer Mode
AUSF Authentication Server Function
BS Base Station
BSC Base Station Controller
BTS Base Transceiver Station
CD Compact Disk
CDMA Code Division Multiple Access
CE Control Element
COTS Commercial Off-the-Shelf
CPE Customer Premise Equipment
CPU Central Processing Unit
CS Cyclic Shift
CSI Channel State Information D2D Device-to-Device
DAS Distributed Antenna System
DC Direct Current
DCI Downlink Control Information
DFT Discrete Fourier Transform
DIMM Dual In-Line Memory Module
DL Downlink
DMRS Demodulation Reference Signal
DSP Digital Signal Processor
DVD Digital Video Disk
DwPTS Downlink Pilot Time Slot
EEPROM Electrically Erasable Programmable Read Only Memory
eMTC Enhanced Machine Type Communication
eNB Enhanced or Evolved Node B
EPROM Erasable Programmable Read Only Memory
E-SMLC Evolved Serving Mobile Location Center
FH Frequency Hopping
FPGA Field Programmable Gate Array
GHz Gigahertz
gNB New Radio Base Station
GPS Global Positioning System
GSM Global System for Mobile Communications
HARQ Hybrid Automatic Repeat Request
HDDS Holographic Digital Data Storage
HD-DVD High-Density Digital Versatile Disc
HSS Home Subscriber Server
ID Identity
IE Information Element
I/O Input and Output
IoT Internet of Things
IP Internet Protocol
kHz Kilohertz
LAN Local Area Network
LEE Laptop Embedded Equipment
LME Laptop Mounted Equipment
LTE Long Term Evolution
M2M Machine-to-Machine
MAC Medium Access Control
MANO Management and Orchestration
MCE Multi-Cell/Multicast Coordination Entity
MDT Minimization of Drive Tests
MHz Megahertz
MIMO Multiple Input Multiple Output
MME Mobility Management Entity
ms Millisecond
MSC Mobile Switching Center
MSR Multi-Standard Radio
MTC Machine Type Communication
MU-MIMO Multi-User Multiple Input Multiple Output
NACK Negative Acknowledgment
NB-IoT Narrowband Internet of Things
NF Network Function
NFV Network Function Virtualization
NIC Network Interface Controller
NR New Radio
NRF Network Function Repository Function
NSSF Network Slice Selection Function
O&M Operation and Maintenance
OFDM Orthogonal Frequency Division Multiplexing
OSS Operations Support System
OTT Over-the-Top
PCF Policy Control Function
PDA Personal Digital Assistant
PDCCH Physical Downlink Control Channel
PDSCH Physical Downlink Shared Channel
P-GW Packet Data Network Gateway
PRB Physical Resource Block
PROM Programmable Read Only Memory
PUCCH Physical Uplink Control Channel
PUSCH Physical Uplink Shared Channel
RAID Redundant Array of Independent Disks
RAM Random Access Memory
RAN Radio Access Network
RAT Radio Access Technology
RE Resource Element
RF Radio Frequency
RNC Radio Network Controller
ROM Read Only Memory
RRC Radio Resource Control
RRH Remote Radio Head
RRU Remote Radio Unit
RUIM Removable User Identity
SCEF Service Capability Exposure Function
SC-FDMA Single Carrier Frequency Division Multiple Access
SC-OFDMA Single Carrier Orthogonal Frequency Division Multiple Access
SD-RAM Synchronous Dynamic Random Access Memory
SIM Subscriber Identity Module
SINR Signal to Interference plus Noise Ratio
SMF Session Management Function
SOC System on a Chip
SON Self-Organizing Network
SONET Synchronous Optical Networking
SRS Sounding Reference Signal
SU-MIMO Single-User Multiple Input Multiple Output
TCP Transmission Control Protocol
TDD Time Domain Duplexing
UCI Uplink Control Information
UDM Unified Data Management
UE User Equipment
UL Uplink
UMB Ultra Mobile Broadband
UMTS Universal Mobile Telecommunications System
UTRAN Universal Terrestrial Radio Access Network
UPF User Plane Function
UpPTS Uplink Pilot Time Slot
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network
ZC Zadoff-Chu Those skilled in the art will recognize improvements and modifications to the embodiments of the present disclosure. All such improvements and modifications are considered within the scope of the concepts disclosed herein.

REFERENCES

[1] 3GPP TS 36.211 Technical Specification Group Radio Access Network; Evolved Universal Terrestrial Radio Access (E-UTRA); Physical channels and modulation (Release 15), V15.2.0 (2018-06);

[2] 3GPP TS 36.213 Technical Specification Group Radio Access Network; Evolved Universal Terrestrial Radio Access (E-UTRA); Physical layer procedures (Release 15), V15.2.0 (2018-06);

[3] RP-181485, "New WI proposal: DL MIMO efficiency enhancements for LTE", RAN #80, La Jolla, USA, Jun. 11-14, 2018;

What is claimed is:

1. A method in a wireless device for triggering aperiodic Sounding Reference Signal, SRS, the method comprising:
   receiving a first SRS configuration for a first set of wireless device specific SRS uplink normal subframes and/or a second SRS configuration for a second set of wireless device specific uplink normal subframes;
   receiving downlink control information in a first subframe to trigger an aperiodic SRS transmission in a second subframe, the received downlink control information comprises a parameter provided in a same-length SRS request field of the downlink control information for triggering the aperiodic SRS transmission using the first SRS configuration or the second SRS configuration;
   determining whether to use the first SRS configuration or the second SRS configuration based on whether the second subframe is included in the first set of wireless device specific SRS uplink normal subframes or the second set of wireless device specific SRS uplink normal subframes and at least one of:
      one or more higher layer parameters configured to activate the first SRS configuration or the second SRS configuration; and
      a Medium Access Control, MAC, Control Element, CE, configured to activate the first SRS configuration or the second SRS configuration; and
   transmitting the aperiodic SRS transmission in accordance with the determined SRS configuration.

2. The method of claim 1 wherein:
   the first SRS configuration is a configuration for transmission of: (a1) an SRS transmission in a last Single Carrier Frequency Division Multiple Access, SC-FDMA, symbol of a normal uplink subframe, (b1) an SRS sequence generated from a physical cell identity of a corresponding cell, or both (a1) and (b1); and
   the second SRS configuration is a configuration for transmission of: (a2) an SRS transmission in more than one SC-FDMA symbol of a normal uplink subframe, (b2) an SRS sequence generated from a virtual cell identity, or both (a2) and (b2).

3. The method of claim 1 wherein:
   the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; and
   determining whether to use the first SRS configuration or the second SRS configuration comprises determining whether to use the first SRS configuration or the second SRS configuration based on the multi-bit parameter and mappings between the first and second values of the multi-bit parameter and the first and second SRS configurations.

4. The method of claim 1 wherein:
   the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration;
   the value of the multi-bit parameter comprised in the downlink control information for triggering an aperiodic SRS transmission is the first value; and
   determining whether to use the first SRS configuration or the second SRS configuration comprises determining to use the first SRS configuration based on the value of the multi-bit parameter and the mapping between the first value of the multi-bit parameter and the first SRS configuration.

5. The method of claim 1 wherein:
   the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration;
   the value of the multi-bit parameter comprised in the downlink control information for triggering an aperiodic SRS transmission is the second value; and
   determining whether to use the first SRS configuration or the second SRS configuration comprises determining to use the second SRS configuration based on the value of the multi-bit parameter and the mapping between the second value of the multi-bit parameter and the second SRS configuration.

6. The method of claim 1, wherein the second subframe is a first available SRS subframe n+k, where n is a subframe number that corresponds to the first subframe and k is greater than or equal to a predetermined or signaled value $k_p$.

7. The method of claim 1 wherein:
   the first set of wireless device specific SRS uplink normal subframes and the second set of wireless device specific SRS uplink normal subframes are disjoint sets; and
   determining whether to use the first SRS configuration or the second SRS configuration based on whether the second subframe is included in the first set of wireless device specific SRS uplink normal subframes or the second set of wireless device specific SRS uplink normal subframes comprises:
      determining to use the first SRS configuration if the second subframe is in the first set of wireless device specific SRS uplink normal subframes; and
      determining to use the second SRS configuration if the second subframe is in the second set of wireless device specific SRS uplink normal subframes.

8. The method of claim 1, wherein:
   the first set of wireless device specific SRS uplink normal subframes and the second set of wireless device specific SRS uplink normal subframes overlap;
   the second subframe is included in both the first set of wireless device specific SRS uplink normal subframes and the second set of wireless device specific SRS uplink normal subframes; and
   determining whether to use the first SRS configuration or the second SRS configuration based on whether the second subframe is included in the first set of wireless device specific SRS uplink normal subframes or the second set of wireless device specific SRS uplink normal subframes comprises determining whether to use the first SRS configuration or the second SRS configuration based on a predefined or preconfigured rule that defines how collisions are to be handled.

9. The method of claim 1, wherein:
the first set of wireless device specific SRS uplink normal subframes and the second set of wireless device specific SRS uplink normal subframes overlap;
the second subframe is included in both the first set of wireless device specific SRS uplink normal subframes and the second set of wireless device specific SRS uplink normal subframes; and
determining whether to use the first SRS configuration or the second SRS configuration based on whether the second subframe is included in the first set of wireless device specific SRS uplink normal subframes or the second set of wireless device specific SRS uplink normal subframes comprises determining whether to use the first SRS configuration or the second SRS configuration based on priorities associated with the first SRS configuration and the second SRS configuration or based on periodicities of the first SRS configuration and the second SRS configuration.

10. The method of claim 1 further comprising:
receiving an indication to use an indicated type of aperiodic SRS triggering, the indicated type of aperiodic SRS triggering being a first type of aperiodic SRS triggering or a second type of aperiodic SRS triggering;
wherein determining whether to use the first SRS configuration or the second SRS configuration comprises determining whether to use the first SRS configuration or the second SRS configuration based on the indication.

11. The method of claim 10 wherein receiving the indication comprises receiving the indication via higher layer signaling.

12. The method of claim 10 wherein receiving the indication comprises receiving the indication via a Medium Access Control, MAC, Control Element, CE.

13. A wireless device for triggering aperiodic Sounding Reference Signal, SRS, wherein the wireless device comprises:
one or more transmitters;
one or more receivers; and
processing circuitry associated with the one or more transmitters and the one or more receivers, the processing circuitry configured to cause the wireless device to:
receive a first SRS configuration for a first set of wireless device specific SRS uplink normal subframes and/or a second SRS configuration for a second set of wireless device specific uplink normal subframes;
receive downlink control information in a first subframe to trigger an aperiodic SRS transmission in a second subframe, the received downlink control information comprises a parameter provided in a same-length SRS request field of the downlink control information for triggering the aperiodic SRS transmission using the first SRS configuration or the second SRS configuration;
determine whether to use the first SRS configuration or the second SRS configuration based on whether the second subframe is included in the first set of wireless device specific SRS uplink normal subframes or the second set of wireless device specific SRS uplink normal subframes and at least one of:
one or more higher layer parameters configured to activate the first SRS configuration or the second SRS configuration; and
a Medium Access Control, MAC, Control Element, CE, configured to activate the first SRS configuration or the second SRS configuration; and
transmit the aperiodic SRS transmission in accordance with the determined SRS configuration.

14. A method performed by a base station for triggering aperiodic Sounding Reference Signal, SRS, comprising:
transmitting, to a wireless device, a first SRS configuration for a first set of wireless device specific SRS uplink normal subframes and/or a second SRS configuration for a second set of wireless device specific uplink normal subframes;
transmitting, to the wireless device, downlink control information in a first subframe to trigger an aperiodic SRS transmission in a second subframe, the received downlink control information comprises a parameter provided in a same-length SRS request field of the downlink control information for triggering the aperiodic SRS transmission using the first SRS configuration or the second SRS configuration; and
receiving, from the wireless device, an aperiodic SRS transmission in accordance with one of the first and second SRS configurations determined based on whether the second subframe is included in the first set of wireless device specific SRS uplink normal subframes or the second set of wireless device specific SRS uplink normal subframes and at least one of:
one or more higher layer parameters configured to activate the first SRS configuration or the second SRS configuration; and
a Medium Access Control, MAC, Control Element, CE, configured to activate the first SRS configuration or the second SRS configuration.

15. The method of claim 14 wherein:
the first SRS configuration is a configuration for transmission of: (a) an SRS transmission in a last Single Carrier Frequency Division Multiple Access, SC-FDMA, symbol of a normal uplink subframe and/or (b) an SRS sequence generated from a physical cell identity; and
the second SRS configuration is a configuration for transmission of: (a) an SRS transmission in more than one SC-FDMA symbol of a normal uplink subframe and/or (b) an SRS sequence generated from a virtual cell identity.

16. The method of claim 14 wherein:
the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration; and
receiving, from the wireless device, the aperiodic SRS transmission in accordance with one of the first and second SRS configurations comprises receiving, from the wireless device, the aperiodic SRS transmission in accordance with the value of the multi-bit parameter and mappings between the first and second values of the multi-bit parameter and the first and second SRS configurations.

17. The method of claim 14 wherein:
the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration;

the value of the multi-bit parameter comprised in the downlink control information for triggering an aperiodic SRS transmission is the first value; and receiving, from the wireless device, the aperiodic SRS transmission in accordance with one of the first and second SRS configurations comprises receiving, from the wireless device, the aperiodic SRS transmission in accordance with the mapping between the first value of the multi-bit parameter and the first SRS configuration.

18. The method of claim 14 wherein:

the parameter comprised in the downlink control information for triggering an aperiodic SRS transmission is a multi-bit parameter comprising two or more bits, wherein a first value of the multi-bit parameter is mapped to the first SRS configuration and a second value of the multi-bit parameter is mapped to the second SRS configuration;

the value of the multi-bit parameter comprised in the downlink control information for triggering an aperiodic SRS transmission is the second value; and receiving, from the wireless device, the aperiodic SRS transmission in accordance with one of the first and second SRS configurations comprises receiving, from the wireless device, the aperiodic SRS transmission in accordance with the mapping between the second value of the multi-bit parameter and the second SRS configuration.

* * * * *